United States Patent
Naito

(10) Patent No.: US 10,200,455 B2
(45) Date of Patent: Feb. 5, 2019

(54) INFORMATION PROCESSING SYSTEM AND METHOD

(71) Applicant: Hisashi Naito, Kanagawa (JP)

(72) Inventor: Hisashi Naito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 263 days.

(21) Appl. No.: 14/482,067

(22) Filed: Sep. 10, 2014

(65) Prior Publication Data

US 2015/0081834 A1    Mar. 19, 2015

(30) Foreign Application Priority Data

Sep. 17, 2013   (JP) .................................. 2013-191668
Sep. 9, 2014    (JP) .................................. 2014-182867

(51) Int. Cl.
*H04L 29/08*   (2006.01)

(52) U.S. Cl.
CPC .................................. *H04L 67/10* (2013.01)

(58) Field of Classification Search
CPC ............................. H04L 67/10; H04L 67/40
USPC ........................................................ 709/213
See application file for complete search history.

(56) References Cited

U.S. PATENT DOCUMENTS

| | | | |
|---|---|---|---|
| 8,402,265 B2 | 3/2013 | Nanaumi | |
| 2003/0009568 A1* | 1/2003 | McIntyre | G06F 17/3028 |
| | | | 709/229 |
| 2004/0156076 A1* | 8/2004 | Togami | H04N 1/40062 |
| | | | 358/2.1 |
| 2006/0010502 A1* | 1/2006 | Mimatsu | G06F 3/0607 |
| | | | 726/27 |
| 2008/0072288 A1 | 3/2008 | Ohtani | |
| 2008/0252922 A1* | 10/2008 | Ikegami | H04L 63/083 |
| | | | 358/1.15 |
| 2011/0035660 A1* | 2/2011 | Lussier | G06F 17/212 |
| | | | 715/239 |
| 2012/0182575 A1 | 7/2012 | Ikeda | |
| 2012/0194837 A1 | 8/2012 | Kamata | |
| 2013/0132599 A1* | 5/2013 | Nakashima | H04L 67/34 |
| | | | 709/230 |

(Continued)

FOREIGN PATENT DOCUMENTS

| | | |
|---|---|---|
| JP | 2005-267448 | 9/2005 |
| JP | 2007-293654 | 11/2007 |

(Continued)

*Primary Examiner* — Nicholas R Taylor
*Assistant Examiner* — Meng Vang
(74) *Attorney, Agent, or Firm* — IPUSA, PLLC

(57) ABSTRACT

An information processing system includes a reception part and a process control part. The reception part receives a processing request including process identification information identifying a process and user identification information from an apparatus. The process control part, when the received user identification information is stored in correlation with the received process identification information, executes the process according to the process identification information based on the result of applying change information stored in correlation with the received user identification information to setting information stored in correlation with apparatus identification information identifying the apparatus and with the received process identification information.

13 Claims, 19 Drawing Sheets

(56) References Cited

U.S. PATENT DOCUMENTS

2013/0179961 A1\* 7/2013 Abe ..................... G06F 21/608
  726/9
2014/0016165 A1 1/2014 Ando

FOREIGN PATENT DOCUMENTS

| JP | 2011-205377 | 10/2011 |
| JP | 2012-147335 | 8/2012 |
| JP | 2012-156824 | 8/2012 |

\* cited by examiner

FIG.7

| TENANT ID | USER ID | PASSWORD | ROLE | ... |
|---|---|---|---|---|
| 123 | A | xxxx | MANAGER | ... |
| 123 | B | xxxx | USER | ... |
| 123 | C | xxxx | USER | ... |
| 123 | D | xxxx | USER | ... |
| 123 | D | xxxx | USER | ... |
| : | : | : | : | : |

| TENANT ID | PROFILE NAME | AUTHENTICATION NECESSITY | GROUP |||  PROJECT ||||||| 254p |
|---|---|---|---|---|---|---|---|---|---|---|---|---|
| | | | GROUP NAME | LAYOUT INFORMATION | PROJECT ID | LABEL | READING CONDITIONS | FILENAME | PROCESSING INFORMATION | STORAGE ASSOCIATION INFORMATION | ALL USERS ACCESS AUTHORIZATION /NO AUTHORIZATION |
| 123 | A4pf | YES | SALES | | P001 | DAILY REPORT | DUPLEX, 300dpi,jpeg | <DATE AND TIME> | OCR | StorageA, /DAILY REPORT | NO |
| | | | | | P002 | CUSTOMER INFORMATION | SIMPLEX, 600dpi,pdf | ... | - | StorageA, /CUSTOMER INFORMATION | YES |
| | | | | | P003 | MERCHANDISE INFORMATION | SIMPLEX, 600dpi,pdf | ... | - | StorageA, /MERCHANDISE INFORMATION | NO |
| | | | | | P004 | SLIP | SIMPLEX, 600dpi,pdf | ... | - | StorageA, /SLIP | YES |
| | | | DEVELOPMENT | ... | P005 | ... | ... | ... | ... | ... | ... |
| 123 | A2pf | NO | ... | ... | ... | ... | ... | ... | ... | ... | ... |

FIG.11

| TENANT ID | PROJECT ID | USER ID | READING CONDITIONS | FILENAME | ... |
|---|---|---|---|---|---|
| 123 | P001 | A | | | |
| 123 | P001 | B | | | |
| 123 | P003 | A | | | |

| BODY NUMBER | PROFILE NAME |
|---|---|
| 12345 | A4pf |
| 67890 | A2pf |
| : | : |

| TENANT ID | PROJECT ID | USER ID | READING CONDITIONS | FILENAME | ... |
|---|---|---|---|---|---|
| 123 | P001 | A | SIMPLEX,400dpi,jpeg | | |
| 123 | P001 | B | | | |
| 123 | P003 | A | | | |

255p

INFORMATION PROCESSING SYSTEM AND METHOD

CROSS-REFERENCE TO RELATED APPLICATIONS

The present application is based upon and claims the benefit of priority of Japanese Patent Applications No. 2013-191668, filed on Sep. 17, 2013, and No. 2014-182867, filed on Sep. 9, 2014, the entire contents of which are incorporated herein by reference.

BACKGROUND OF THE INVENTION

1. Field of the Invention

The present invention relates to information processing systems and methods.

2. Description of the Related Art

There is a system in which image data scanned in an image forming apparatus such as a multifunction peripheral are transferred to a cloud service and a process according to preset settings information (such as storage in an online storage system) is executed on the image data in the cloud service.

Reference may be made to, for example, Japanese Laid-Open Patent Application No. 2007-293654 for related art.

SUMMARY OF THE INVENTION

According to an aspect of the present invention, an information processing system, which includes an information processing apparatus and executing processing according to processing requests from a plurality of apparatuses connected to the information processing apparatus via a network, includes a first storage part configured to correlate and store process identification information identifying one or more processes and setting information of the one or more processes with respect to each of items of apparatus identification information identifying the apparatuses; a second storage part configured to correlate and store an item of the process identification information, change information with respect to a part or entirety of the setting information stored in the first storage part in correlation with the item of the process identification information, and user identification information identifying a user to whom the change information is applied among users authorized to use the information processing system; a reception part configured to receive a processing request including the process identification information identifying a process of the one or more processes, and the user identification information, from one of the apparatuses; and a process control part configured to, when the user identification information received by the reception part is stored in the second storage part in correlation with the process identification information received by the reception part, execute said process according to the process identification information, based on a result of applying the change information stored in the second storage part in correlation with the user identification information received by the reception part to the setting information stored in correlation with the apparatus identification information identifying the one of the apparatuses and with the received process identification information among the setting information stored in the first storage part.

According to an aspect of the present invention, an information processing system, which includes an information processing apparatus and executing processing according to processing requests from a plurality of apparatuses connected to the information processing apparatus via a network, includes a reception part configured to receive a processing request including process identification information identifying a process, and user identification information, from one of the apparatuses; and a process control part configured to obtain setting information stored in correlation with apparatus identification information identifying the one of the apparatuses and the process identification information received by the reception part, from a first storage part, the first storage part correlating and storing process identification information identifying one or more processes and setting information of the one or more processes with respect to each of items of apparatus identification information identifying the apparatuses, when the user identification information received by the reception part is stored in a second storage part in correlation with the process identification information received by the reception part, the second storage part correlating and storing an item of the process identification information, change information with respect to a part or entirety of the setting information stored in the first storage part in correlation with the item of the process identification information, and user identification information identifying a user to whom the change information is applied among users authorized to use the information processing system, obtain the change information stored in the second storage part in correlation with the received user identification information, and execute said process according to the process identification information based on a result of applying the obtained change information to the obtained setting information.

According to an aspect of the present invention, an information processing method, executed by an information processing system including an information processing apparatus and executing processing according to processing requests from a plurality of apparatuses connected to the information processing apparatus via a network, includes using a first storage part configured to correlate and store process identification information identifying one or more processes and setting information of the one or more processes with respect to each of items of apparatus identification information identifying the apparatuses, and a second storage part configured to correlate and store an item of the process identification information, change information with respect to a part or entirety of the setting information stored in the first storage part in correlation with the item of the process identification information, and user identification information identifying a user to whom the change information is applied among users authorized to use the information processing system; receiving a processing request including the process identification information identifying a process of the one or more processes, and the user identification information, from one of the apparatuses; and when the user identification information received by the reception part is stored in the second storage part in correlation with the process identification information received by the reception part, executing said process according to the process identification information, based on a result of applying the change information stored in the second storage part in correlation with the user identification information received by the reception part to the setting information stored in correlation with the apparatus identification information identifying the one of the apparatuses and with the received process identification information among the setting information stored in the first storage part.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 7 is a diagram illustrating a configuration of a user information storage part;

FIG. 8 is a diagram illustrating a configuration of a profile storage part;

FIG. 11 is a diagram illustrating a configuration of a user individual information storage part;

FIG. 13 is a diagram illustrating a configuration of a profile-apparatus correspondence storage part;

FIG. 17 is a diagram illustrating a user individual information storage part with which settings information is registered;

DETAILED DESCRIPTION OF THE PREFERRED EMBODIMENTS

In the above-described system, if it is possible to change the contents of the settings information with respect to each of users belonging to a company (tenant) under contract to use the system, improvement in the convenience of the system may be expected.

According to an aspect of the present invention, it is possible to execute a process suitable for each user in response to a processing request from an apparatus.

A description is given below, with reference to the accompanying drawings, of embodiments of the present invention.

Figure 1:
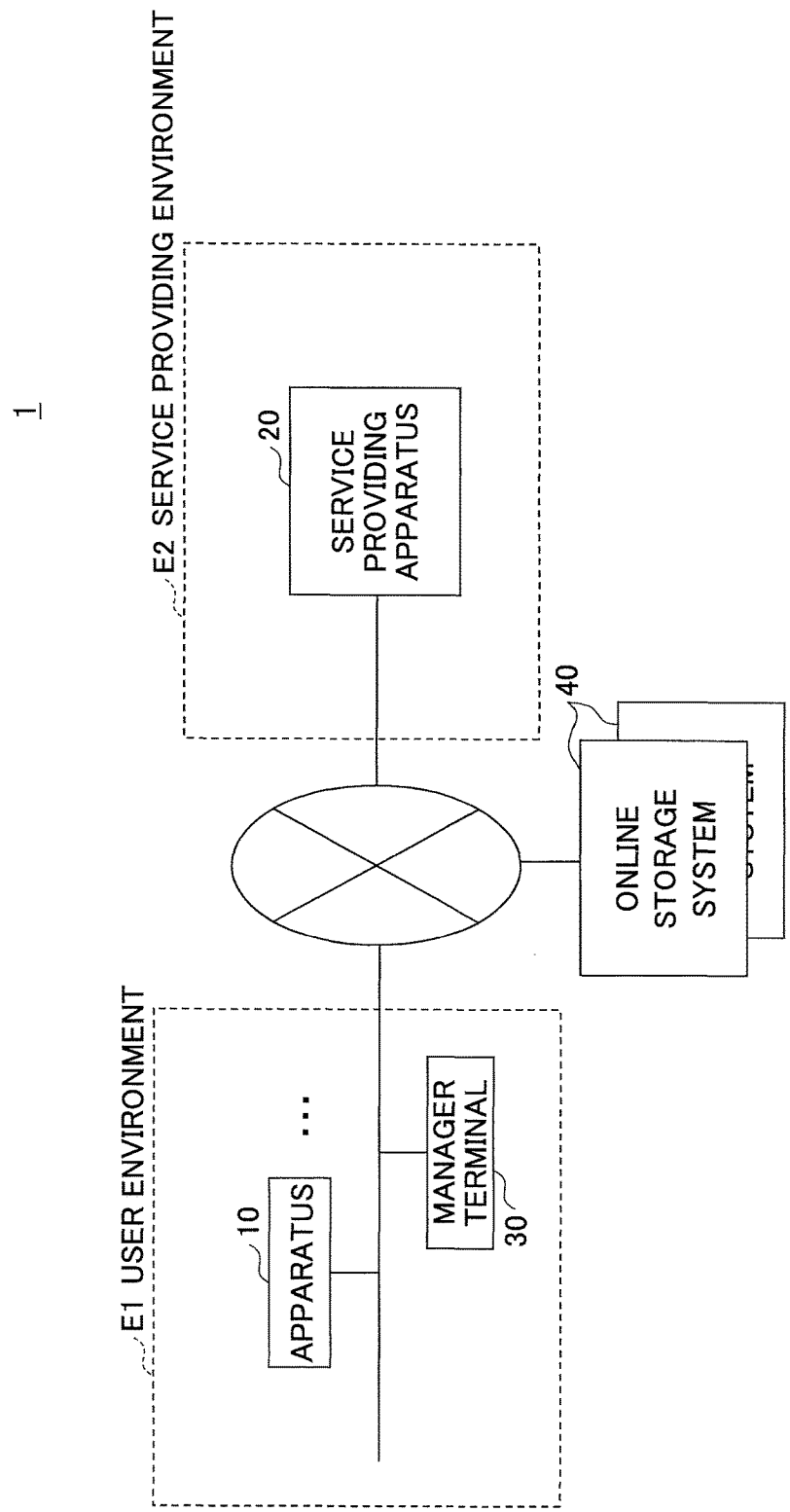
FIG. 1 is a diagram illustrating a configuration of an information processing system according to an embodiment.

FIG. 1 is a diagram illustrating a configuration of an information processing system according to an embodiment. Referring to FIG. 1, an information processing system 1 includes a service providing environment E2, a user environment E1, and one or more online storage systems 40 (which may be hereinafter collectively referred to as "online storage system 40"), all of which are enabled to communicate with one another via a wide-area network such as the Internet.

The service providing environment E2 is a system environment in an organization that provides one or more cloud services via a network. While a description is given of this embodiment, taking a cloud service as a specific example, this embodiment may also be applied to other forms of services provided via a network, such as services provided by application service provider (ASP)s and Web services.

The service providing environment E2 includes a service providing apparatus 20. The user environment E1 includes one or more apparatuses 10, which may be hereinafter collectively referred to as "apparatus 10". The service providing apparatus 20 provides predetermined services via a network. One of the services provided by the service providing apparatus 20 is a "cloud scan service." The cloud scan service refers to a service to distribute image data scanned in and transferred from the apparatus 10 to a predetermined storage. The service providing apparatus 20 may alternatively be installed in the user environment E1. That is, the service providing environment E2 may be included in the user environment E1.

The user environment E1 is a system environment in an organization such as a company that uses the apparatus 10. In the user environment E1, the apparatus 10 and a manager terminal 30 are connected via a network such as a local area network (LAN). The apparatus 10 of this embodiment is an image forming apparatus that has a scan function. A multifunction peripheral that has one or more functions other than the scan function, such as a print function, a copy function and/or a facsimile (FAX) function, may be used as the apparatus 10.

The manager terminal 30 is a terminal used by a manager of the apparatus 10 in the user environment E1. Examples of the manager terminal 30 include a personal computer (PC), a personal digital assistant (PDA), a tablet terminal, a smartphone, and a cellular phone.

The online storage system 40 is a computer system that provides a cloud service called "online storage" via a network. The online storage is a service to lend out a storage area of a storage. In this embodiment, the storage area lent out by the online storage is an optional distribution destination of image data in the cloud scan service provided by the service providing apparatus 20.

Figure 2:
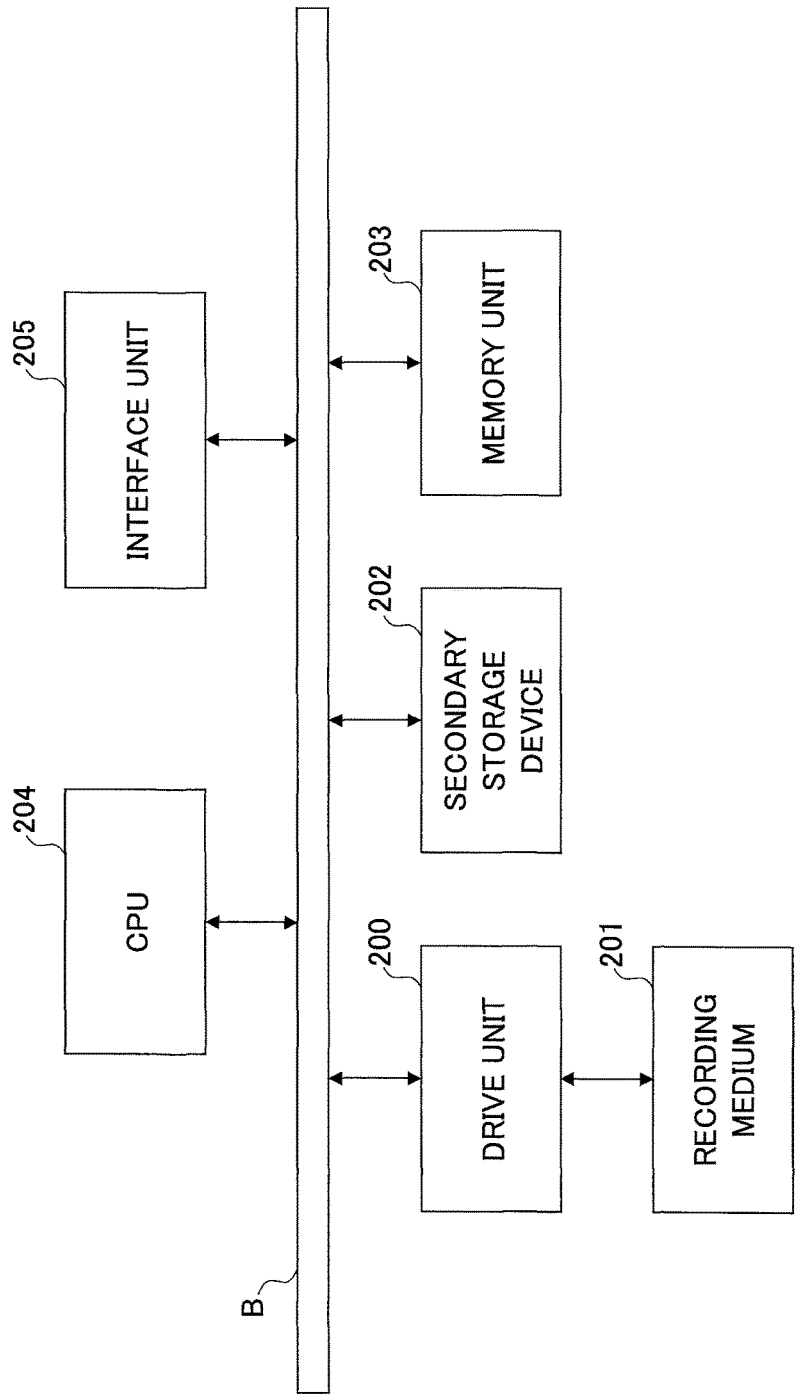
FIG. 2 is a diagram illustrating a hardware configuration of a service providing apparatus according to an embodiment.

FIG. 2 is a diagram illustrating a hardware configuration of a service providing apparatus according to an embodiment. Referring to FIG. 2, the service providing apparatus 20 includes a drive unit 200, a secondary storage device 202, a memory unit 203, a central processing unit (CPU) 204, and an interface (I/F) unit 205, all of which are interconnected by a bus B.

A program that implements processes in the service providing apparatus 20 is provided by way of a recording medium 201 such as a CD-ROM. When the recording medium 201 storing a program is loaded into the drive unit 200, the program is installed in the secondary storage device 202 from the recording medium 201 via the drive unit 200. The program, however, does not necessarily have to be installed from the recording medium 201, and may be downloaded from another computer via a network. The secondary storage device 202 stores not only installed programs but also files and data.

The memory unit 203 reads a program from the secondary storage device 202 and stores the read program in response to an instruction to activate the program. The CPU 204 executes functions pertaining to the service providing apparatus 20 in accordance with a program stored in the memory unit 203. The interface unit 205 is used as an interface for connecting to a network.

The service providing apparatus 20 may be formed of multiple computers each having the hardware as illustrated in FIG. 2. That is, the processes executed by the service providing apparatus 20 in the following description may be distributed among and executed by multiple computers.

Figure 3:
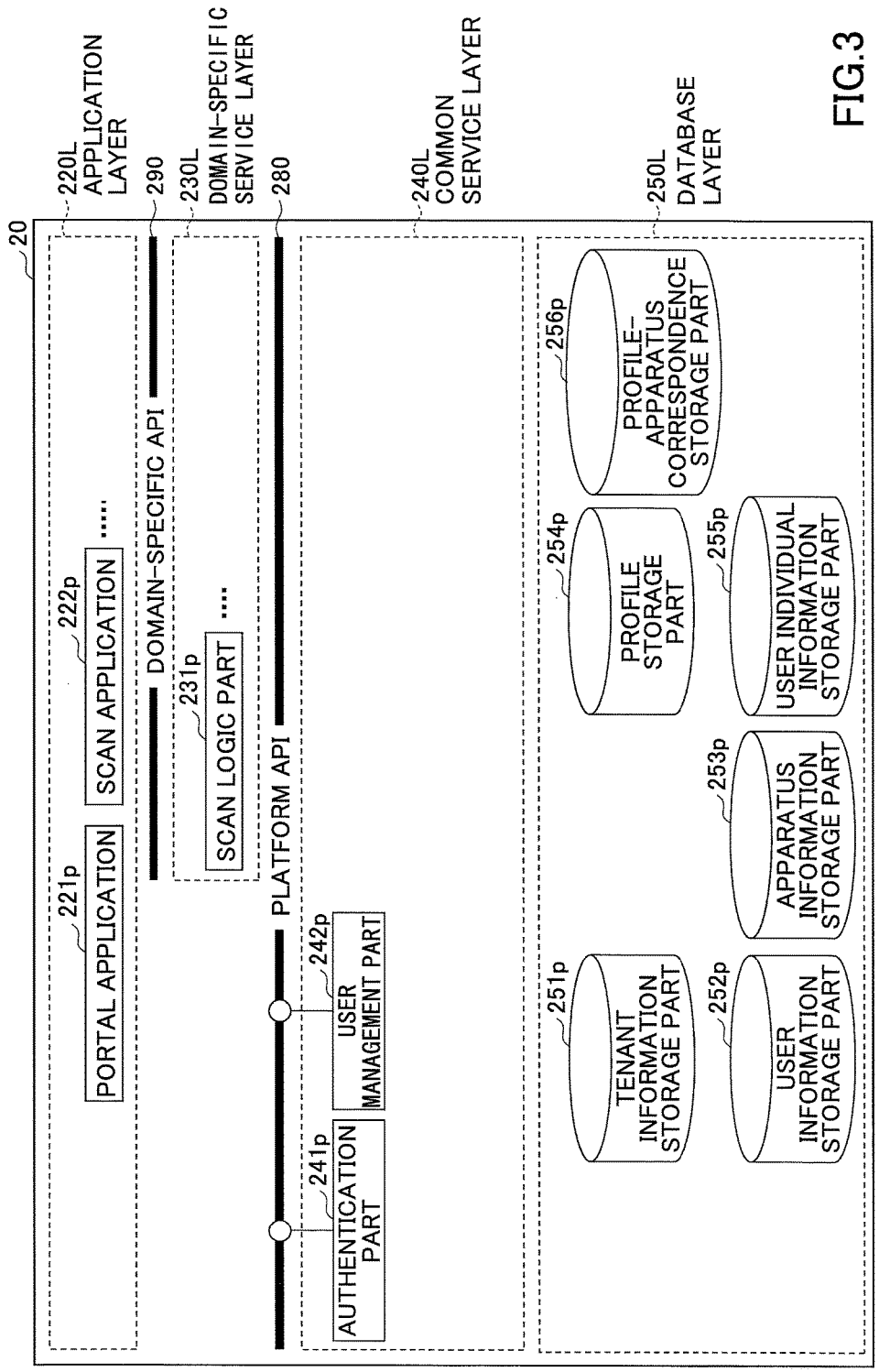
FIG. 3 is a diagram illustrating a functional configuration of a service providing apparatus according to an embodiment.

FIG. 3 is a diagram illustrating a functional configuration of a service providing apparatus according to an embodiment. Referring to FIG. 3, functions of the service providing apparatus 20 are classified into four layers that are an application layer 220L, a domain-specific service layer 230L, a common service layer 240L, and a database layer 250L.

The application layer 220L is a layer where server-side applications (hereinafter referred to as "server applications") related to the cloud scan service are implemented. Referring to FIG. 3, the application layer 220L includes a portal application 221p and a scan application 222p. The portal application 221p is a server application that provides the portal site of the cloud scan service. In the portal site, it is possible to register user information and set settings information with respect to the server application user by user. The scan application 222p is a server application that executes a server-side process with respect to the above-described cloud scan service. Server applications related to services other than the cloud scan service may be added to the application layer 220L.

The common service layer 240L is a layer that includes functions common to multiple server applications or basic functions used by multiple server applications. Functions of the common service layer 240L may be called through a platform application programming interface (API) 280. The platform API 280 is basically called from server applications in the application layer 220L or from the domain-specific service layer 230L. The platform API 280 may be made open to a third-party vendor different from an operator of the service providing apparatus 20. In this case, server applications may be implemented by the third-party vendor. That is, server applications are suitably developed and added using the platform API 280.

Referring to FIG. 3, the common service layer 240L includes an authentication part 241p and a user management part 242p. The authentication part 241p performs authentication and authorization with respect to a user or the apparatus 10 that accesses the service providing apparatus 20. The authorization includes determining whether to authorize a user or the apparatus 10 to access a service that is an access target. For example, the authorization is performed based on the presence or absence of a license for a service that is an access target. The user management part 242p manages information related to authenticated users.

The domain-specific service layer 230L is a layer that provides services of higher completeness, coarser granularity, or higher applicability than the common service layer 240L. Services provided by the domain-specific service layer 230L are available through a domain-specific API 290. The domain-specific API 290 is an API of coarser granularity than the platform API 280. The domain-specific API 290 as well may be made open to the outside. The domain-specific service layer 230L includes a scan logic part 231p. The scan logic part 231p executes a logic part of the cloud scan service. The logic part of the cloud scan service is the function of the scan application 222p except for a user interface (UI) function. The UI function mainly refers to the function of generating and providing a Web UI (Web page). Accordingly, in the configuration of FIG. 3, the main function of the scan application 222p is related to the UI function as a result of using the scan logic part 231p.

The provision of the domain-specific service layer 230L and the provision of the domain-specific API 290 make it possible to reduce the amount of source codes to be implemented when other cloud services or the like cooperate with the cloud scan service, for example. That is, a single function or method (hereinafter collectively referred to as "method") of the domain-specific API 290 provides a function close to a server application by calling multiple methods of the platform API 280. Accordingly, the domain-specific API 290 is effective in such a case where it is desired to realize early cooperation even with a ready-made service. Furthermore, a server application having multiple functions may be implemented using the domain-specific API 290. On the other hand, it is preferable to use the platform API 280 when it is desired to implement a unique server application.

The database layer 250L is a layer including a database that stores various kinds of information. Referring to FIG. 3, the database layer 250L includes a tenant information storage part 251p, a user information storage part 252p, an apparatus information storage part 253p, a profile storage part 254p, a user individual information storage part 255p, and a profile-apparatus correspondence storage part 256p. These storage parts 251p through 256p may be included in the secondary storage device 202 (FIG. 2) or be included in an external storage device connected to the service providing apparatus 20 via a network. As a further alternative, of the storage parts 251p through 256p, some may be included in the secondary storage device 202 and others may be included in an external storage device.

The tenant information storage part 251p stores the attribute information of each tenant (hereinafter referred to as "tenant information") of the service providing apparatus 20. The tenant refers to a user unit under contract to use the cloud scan service (contract organization). For example, the tenant is a group of one or more users, such as a company or another corporation. According to this embodiment, it is assumed that one user environment E1 corresponds to one tenant. The tenant information includes a tenant ID for identifying each tenant. The user information storage part 252p stores the attribute information of each individual user (hereinafter simply referred to as "user") belonging to the tenant (hereinafter referred to as "user information"). The user information includes a user ID for identifying each user and a password used for authentication of each user. Furthermore, the user information includes the tenant ID of a tenant to which a user belongs as well. This is because it is satisfactory if the uniqueness of the user ID is guaranteed within the tenant. That is, according to this embodiment, each user is identified by the combination of a tenant ID and a user ID.

The apparatus information storage part 253p stores the attribute information of each apparatus 10 (hereinafter referred to as "apparatus information") used in a tenant in correlation with the tenant ID of the tenant. The apparatus information includes, for example, identification information for identifying the (individual) body of each apparatus 10 (hereinafter referred to as "body number").

The profile storage part 254p stores a profile. The profile includes the configuration information of an operation screen displayed on the apparatus 10 and settings information related to the processing of the cloud scan service executed in response to an operation performed on the operation screen. The user individual information storage part 255p stores the individual customized information of each user (hereinafter referred to as "user individual information") with respect to the profile. That is, while the profile is information common to individual users, a difference or change from the common information is stored user by user as user individual information in the user individual information storage part 255p. The profile-apparatus correspondence storage part 256p includes information on correspondence between the profile and the apparatus 10.

Figure 4:
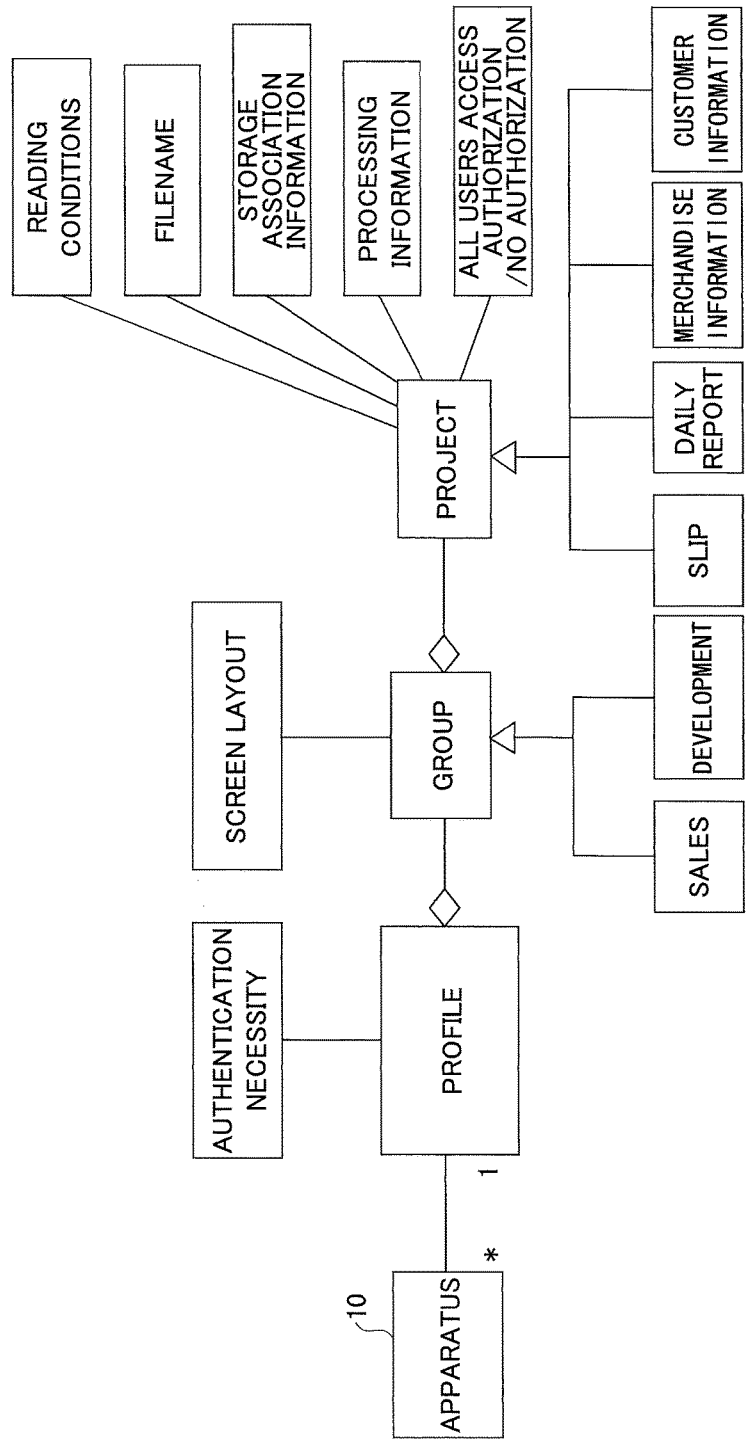
FIG. 4 is a diagram for illustrating a conceptual model of a profile.

FIG. 4 is a diagram for illustrating a conceptual model of a profile. Referring to FIG. 4, each apparatus 10 is correlated with one profile. Multiple profiles, however, may be set for a single apparatus 10. For example, different profiles for different users may be set for a single apparatus 10. Each profile has "authentication necessity" as an attribute. The authentication necessity is an attribute that indicates whether user authentication is necessary to use the profile.

One profile includes one or more groups. The group is a concept that corresponds to, for example, a tab window on the operation screen. In FIG. 4, SALES and DEVELOPMENT, which correspond to a sales tab window and a development tab window, respectively, are displayed as specific examples of groups.

One group includes one or more projects and screen layout information. The project corresponds to, for example, an operation component such as a button placed on a tab window, and is a concept corresponding to the definition of a process flow executed in the cloud scan service. In FIG. 4, SLIP, DAILY REPORT, MERCHANDISE INFORMATION, and CUSTOMER INFORMATION are displayed as specific examples of projects. These correspond to, for example, buttons placed on the sales tab window.

The screen layout information indicates positions at which buttons are placed and the sizes of buttons in a tab window.

One project includes reading conditions, a filename, storage association information, processing information, and all users access authorization/no authorization. The reading conditions are reading conditions at the time of scanning. The filename is the filename of a file in which scanned image data are stored. The storage association information is information indicating which folder in which online storage system 40 is determined as a distribution destination of scanned image data. The processing information is information related to processing (image processing) performed on scanned image data before distribution of the scanned image data. The all users access authorization/no authorization is information indicating whether to authorize all users to use the project. That is, the all users access authorization/no authorization is information indicating whether to limit users who can use the project. Here, "all users" refers to all of the users of a tenant to which the apparatus 10 assigned the profile belongs.

Figure 5:
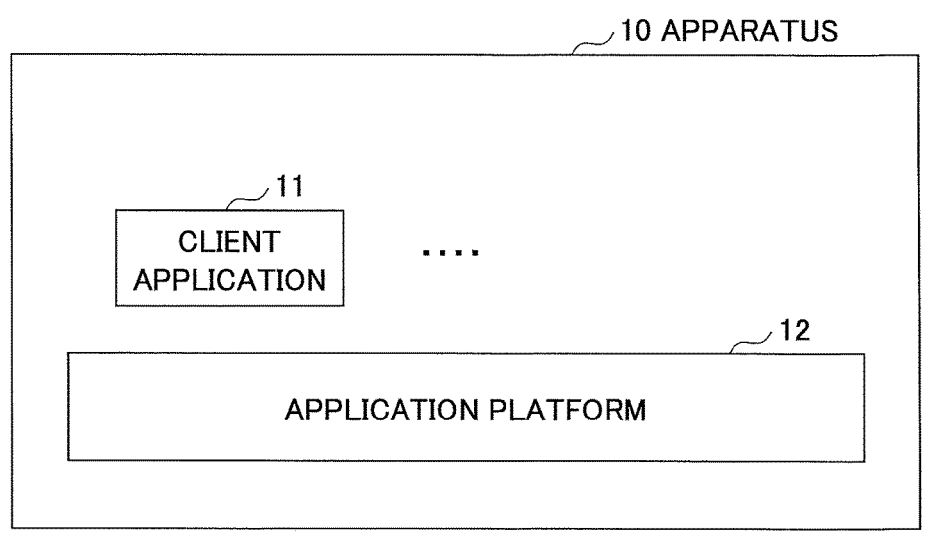
FIG. 5 is a diagram illustrating a functional configuration of an apparatus according to an embodiment.

FIG. 5 is a diagram illustrating a functional configuration of an apparatus according to an embodiment. Referring to FIG. 5, the apparatus 10 includes a client application 11 and an application platform 12.

The client application 11 is an application that uses the domain-specific API 290 (FIG. 3) to provide users with the cloud scan service. Basically, the client application 11 implements functions such as a UI function (a function of displaying a screen) and a function of controlling the apparatus 10 in the cloud scan service.

The application platform 12 includes APIs for controlling the apparatus 10, and provides an execution environment for the client application 11. The form of APIs may be, for example, a function or a class and a method of the class of object-oriented programming. For example, the application platform 12 provides the client application 11 with APIs including an API related to a scan function, an API related to a print function, and an API related to a copy function. The application platform 12 may include a Java (registered trademark) virtual machine (VM). In this case, the client application 11 may be implemented by the Java (registered trademark) language. The application platform 12 further includes a mechanism for causing a server application and the client application 11 to cooperate. Specifically, the application platform 12 provides the client application 11 with a mechanism for communicating with the service providing apparatus 20.

Figure 6:
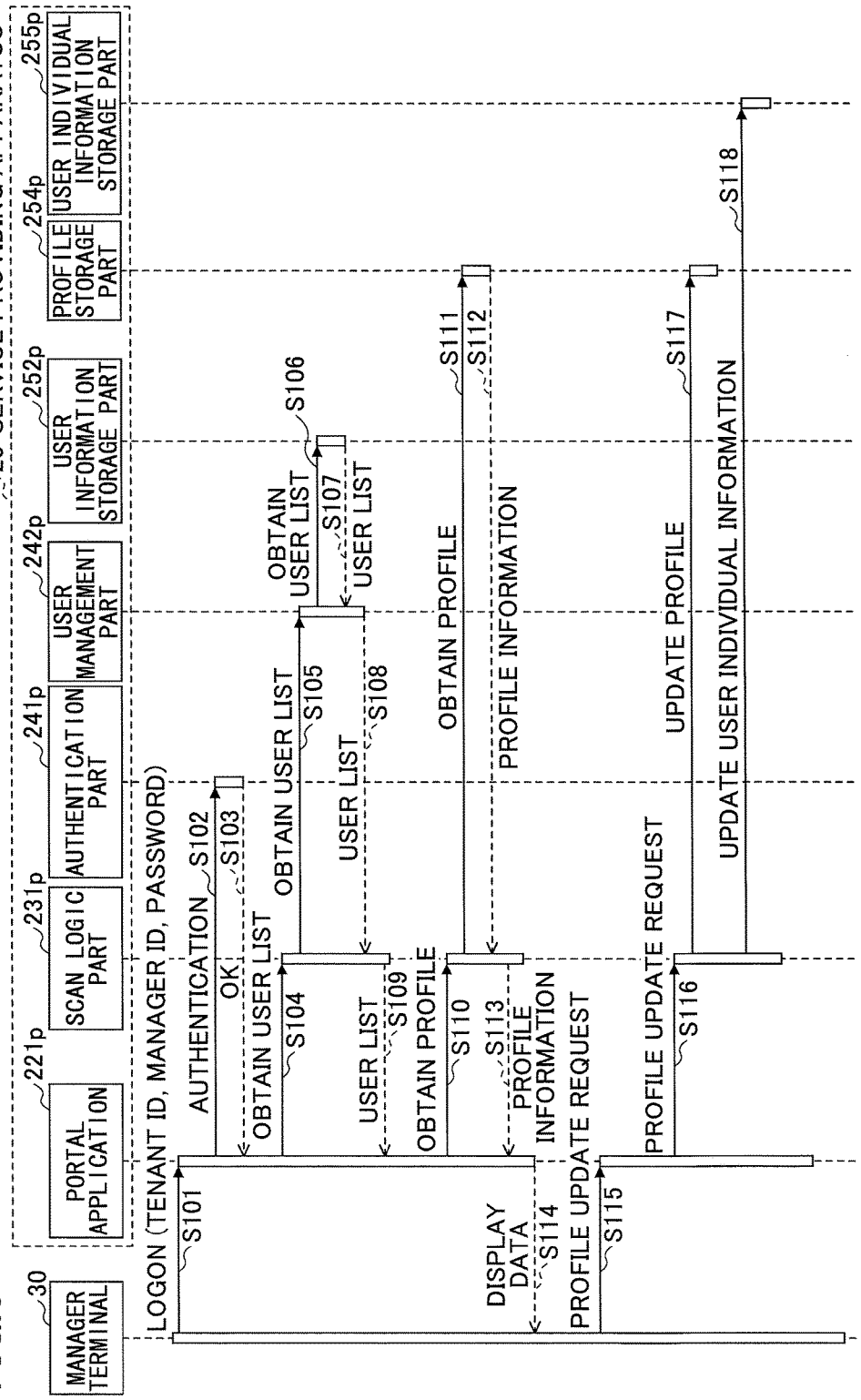
FIG. 6 is a sequence diagram for illustrating a process procedure for a setting process with respect to the all users access authorization/no authorization of a project.

A description is given below of a process procedure executed in the information processing system 1. FIG. 6 is a sequence diagram for illustrating a process procedure for a setting process with respect to the all users access authorization/no authorization of a project. The process of FIG. 6 is executed in response to a manager's operation of the manager terminal 30 in a tenant whose tenant ID is "123" (hereinafter referred to as "tenant 123"). Furthermore, it is assumed that a logon screen for the portal site of the service providing apparatus 20 is displayed on the manager terminal 30 at the start of the process of FIG. 6.

When the manager enters a tenant ID, the user ID of the manager (hereinafter referred to as "manager ID"), and a password on the logon screen, at step S101, the manager terminal 30 transmits a logon request including the entered information to the service providing apparatus 20. The logon request is received by the portal application 221p. At step S102, the portal application 221p requests the authentication part 241p to perform authentication based on the tenant ID, the manager ID, and the password received with the logon request.

The authentication part 241p determines the success or failure of authentication based on the tenant ID, the manager ID, and the password by referring to the user information storage part 252p.

FIG. 7 is a diagram illustrating a configuration of a user information storage part. Referring to FIG. 7, the user information storage part 252p stores, with respect to each user belonging to a tenant, the tenant ID of the tenant, the user ID and password of the user, and the role of the user. The role is an item for identifying a manager among users. That is, in the role, a "manager" is registered with respect to a user who is a manager and a "user" is registered with respect to users other than the manager.

If the set of the tenant ID, manager ID, and password included in the authentication request is stored in the user information storage part 252p, the authentication part 241p determines that the authentication succeeds. Then, at step S103, the authentication part 241p returns a response indicating the result of the authentication to the portal application 221p. If the response from the authentication part 241p indicates the success of the authentication, steps at and after S104 are executed. Hereinafter, the tenant ID and the manager ID based on which the authentication has succeeded are referred to as "logon tenant ID" and "logon manager ID," respectively.

At step S104, the portal application 221p specifies the logon tenant ID, and transmits a request for obtaining a list of user information (hereinafter referred to as "user list") to the scan logic part 231p. At step S105, the scan logic part 231p transfers the request to the user management part 242p. At steps S106 and S107, the user management part 242p obtains a list of user information correlated with the logon tenant ID (a user list) from the user information storage part 252p. At step S108, the user management part 242p returns the obtained user list to the scan logic part 231p. At step S109, the scan logic part 231p returns the user list to the portal application 221p. The user list may include at least the user ID of users.

Next, at step S110, the portal application 221p specifies the logon tenant ID, and transmits a request for obtaining profile information to the scan logic part 231p. At steps S111 and S112, the scan logic part 231p obtains profile information correlated with the logon tenant ID from the profile storage part 254p.

FIG. 8 is a diagram illustrating a configuration of a profile storage part. Referring to FIG. 8, the profile storage part 254p includes, with respect to each profile, items such as a tenant ID, a profile name, authentication necessity, a group, and a project. The record of each profile name is hereinafter referred to as "profile record."

The tenant ID is the tenant ID of a tenant to which the profile belongs. The profile name is the name of the profile. The authentication necessity is an attribute that indicates whether user authentication is necessary to use the profile. In the authentication necessity, "YES" indicates that user authentication is necessary. That is, "YES" indicates that the profile is accessible by authenticated users only. On the other hand, "NO" indicates that no user authentication is necessary. That is, "NO" indicates that the profile is accessible by unauthenticated users as well.

The group is a group included in the profile. The record of each group (hereinafter referred to as "group record") is created in the profile record. The project is a project included in the group. The record of each project (hereinafter referred to as "project record") is created in the group record.

One group record includes a group name, layout information, and one or more project records. The group name is the identification name of the group, and is also a label displayed in the tab of a tab window corresponding to the group. The layout information is information on the placement of buttons in a tab window corresponding to the group.

One project record includes a project ID, a label, reading conditions, a filename, processing information, storage association information, and all users access authorization/no authorization. The project ID is the identification information of each project. According to this embodiment, the project ID in one tenant is unique across profiles. Accordingly, one project is identified by the combination of a tenant ID and a project ID. The label is the label of a button to which the project corresponds. According to this embodiment, the label is identical to the folder name of the storage association information. The reading conditions, the filename, the processing information, the storage association information, and the all users access authorization/no authorization are as described above with reference to FIG. 4. Instead of a fixed character string, for example, a dynamic value such as a date and time may be set in the filename. For example, <date and time> indicates that a character string indicating the date and time of scanning is set as a filename. Furthermore, the all users access authorization/no authorization may have a value "YES" or "NO," where "YES" indicates that all users are authorized to use the project, that is, users who can use the project are not limited. On the other hand, "NO" indicates that all users are not authorized to use the project, that is, users who can use the project are limited.

At step S112, the contents of all profile records correlated with the logon tenant ID are obtained. Hereinafter, the contents of a profile record are referred to as "profile information." At step S113, the scan logic part 231p returns the obtained profile information to the portal application 221p.

The portal application 221p generates display data for displaying a group of setting screens related to profiles based on the user list obtained at step S109 and the profile information obtained at step S113. The display data may be in universal format such as HTML (HyperText Markup Language) format. At step S114, the portal application 221p returns the generated display data to the manager terminal 30. The manager terminal 30 displays a main screen in the group of profile-related setting screens based on the display data.

Figure 9:
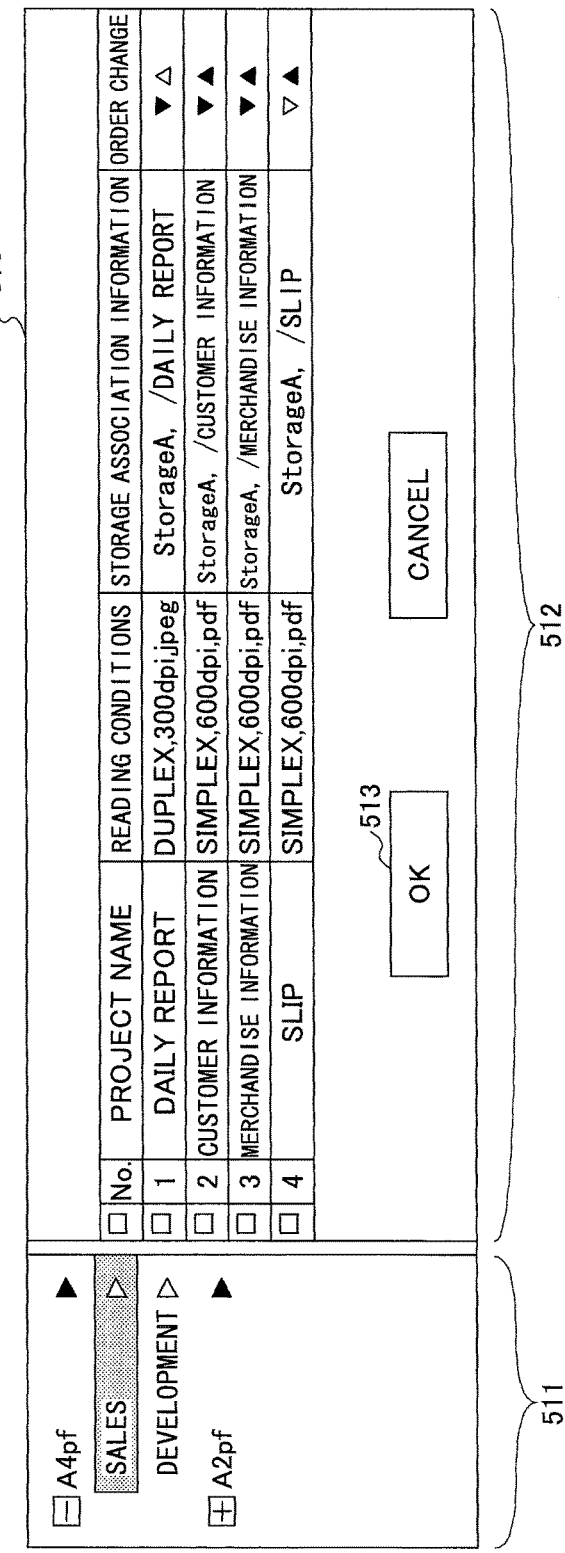
FIG. 9 is a diagram illustrating a display example of a main screen.

FIG. 9 is a diagram illustrating a display example of a main screen. A main screen 510 illustrated in FIG. 9 includes a group selection region 511 and a project display region 512.

In the group selection region 511, a tree structure where a profile is assigned to a node of a first level and a group belonging to the profile is assigned to a node of a second level is displayed.

For example, when a node corresponding to any profile is right-clicked in the group selection region 511, a context menu that offers "YES" and "NO" of the authentication necessity as available choices is displayed. The setting of the authentication necessity for the profile is provided (determined) by operating the context menu.

In the project display region 512, project information is displayed in table format with respect each project belonging to the group selected in the group selection region 511. That is, a line in the table corresponds to one project. By operating "▲" or "▼" in the column of ORDER CHANGE in the table, it is possible to transpose lines. The order of arrangement of lines corresponds to the order of display of buttons corresponding to projects. The order of arrangement of projects in the table corresponds to the order of arrangement of project records in a project storage part.

When one of the projects is selected in the project display region 512 and a predetermined operation is performed, the screen for display changes to an access authorized user selection screen 520 for editing the selected project. The predetermined operation may be, for example, selection of a menu item in a context menu displayed by right-clicking. Alternatively, an advanced settings screen for a project may be displayed by selecting the project, and the access authorized user selection screen 520 may be displayed by operating a predetermined display component on the advanced settings screen.

Figure 10:
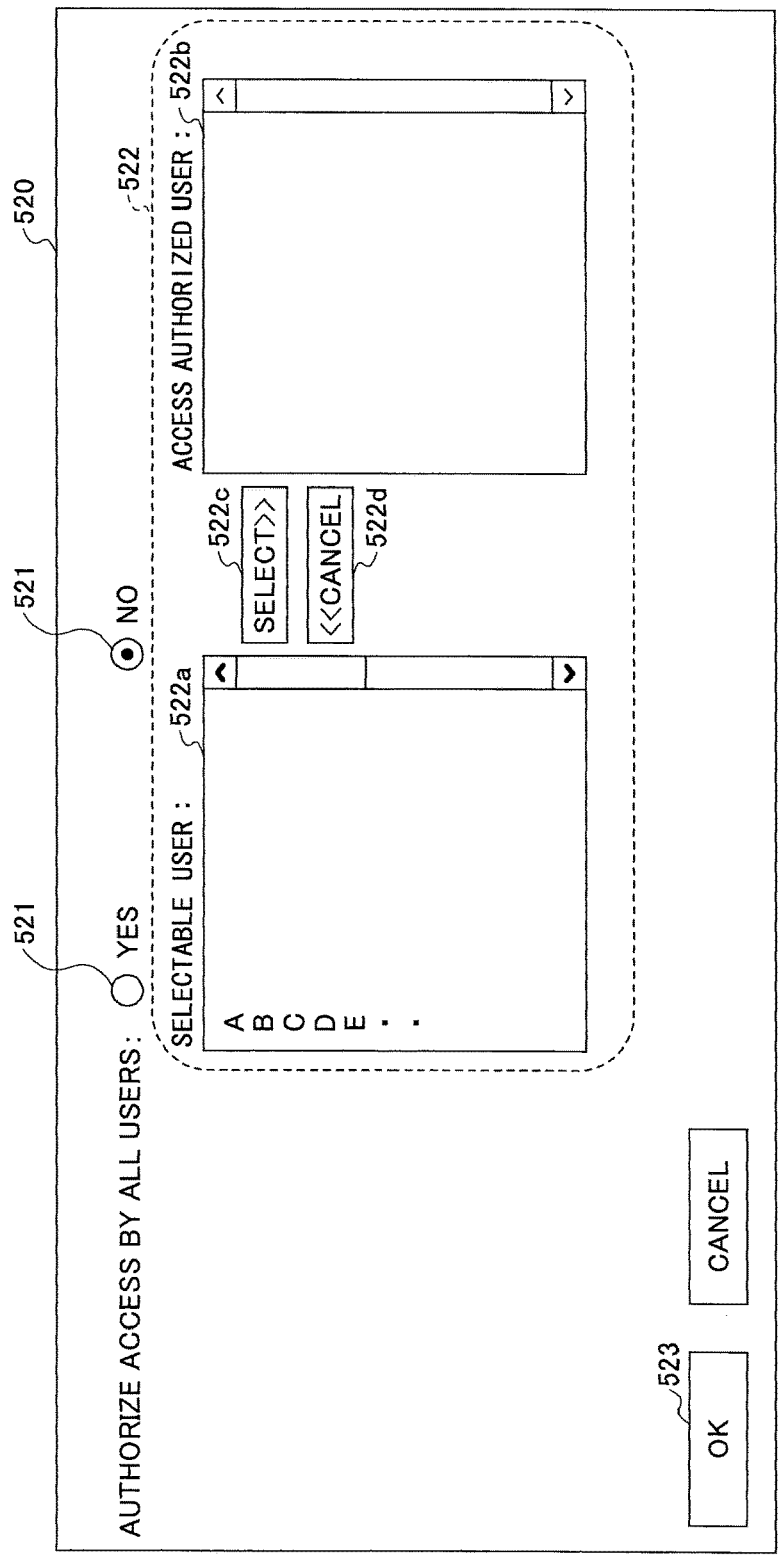
FIG. 10 is a diagram illustrating a display example of an access authorized user selection screen.

FIG. 10 is a diagram illustrating a display example of an access authorized user selection screen. Referring to FIG. 10, the access authorized user selection screen 520 includes toggle buttons 521 and a user selection region 522. The toggle buttons 521 are toggle buttons for causing a determination to be made as to whether to authorize all users to use the project that is subjected to editing. That is, "YES" of the toggle buttons 521 is selected in the case of authorizing use by all users. On the other hand, "NO" of the toggle buttons 521 is selected in the case of not authorizing use by all users. The setting by the toggle buttons 521 corresponds to the all users access authorization/no authorization of the project.

The user selection area 522 becomes operable when "NO" is selected in the toggle buttons 521. The user selection region 522 includes a list box 522a, a list box 522b, a button 522c, and a button 522d. In the list box 522a, the user IDs included in the user list obtained at step S109 are displayed in a list as available choices. That is, in the list box 522a, the user IDs of all users belonging to a tenant pertaining to the logon tenant ID are displayed. When one or more user IDs are selected in the list box 522a and the button 522c is depressed, the selected user IDs move to the list box 522b. The list box 522b includes the user IDs of users who are authorized to use the project that is subjected to editing. Users pertaining to the user IDs moved to the list box 522b are hereinafter referred to as "access authorized users." When one or more user IDs are selected in the list box 522b and the button 522d is depressed, the selected user IDs move to the list box 522a.

When the settings in the toggle buttons 521 and the user selection region 522 are completed and an OK button 523 is depressed, the settings on the access authorized user selection screen 520 are retained, and the screen for display changes to the main screen 510.

Other items of the project may be made editable in a screen other than the access authorized user selection screen 520.

Referring back to FIG. 6, when an OK button 513 is depressed on the main screen 510 (FIG. 9), at step S115, the manager terminal 30 transmits a request for updating the profile including the settings on the main screen 510 and the access authorized user selection screen 520 to the service providing apparatus 20. The settings include the list of user IDs included in the list box 522b of the access authorized user selection screen 520 (hereinafter referred to as "access authorized user list"). In response to reception of the update request, at step S116, the portal application 221p transfers the update request to the scan logic part 231p.

In response to reception of the update request, at step S117, the scan logic part 231p updates the profile information stored in the profile storage part 254p based on the settings included in the update request. For example, the value of authentication necessity is updated. Furthermore, the value of all users access authorization/no authorization of a project record is updated. Specifically, FIG. 8 corresponds to a case where the authentication necessity of a profile whose profile name is "A4pf" is set to "YES." Furthermore, FIG. 8 corresponds to a case where the all users access authorization/no authorization of each of a project whose project ID is "P001" and a project whose project ID is "P003" is set to "NO." That is, FIG. 8 corresponds to a case where "NO" is selected in the toggle buttons 521 of the access authorized user selection screen 520 with respect to the projects. Hereinafter, in the case of distinguishing individual projects by their project IDs, each project is described in the form of "project <project ID>." For example, the project whose project ID is "P001" is described as "project P001."

Next, at step S118, the scan logic part 231p updates the contents of the user individual information storage part 255p based on the access authorized user list contained in the editing result.

FIG. 11 is a diagram illustrating a configuration of a user individual information storage part. Referring to FIG. 11, the user individual information storage part 255p includes items such as a tenant ID, a project ID, a user ID, reading conditions, and a filename.

The tenant ID is the tenant ID of a tenant to which a project customized user by user belongs. The project ID is the project ID of a project that is customized user by user. The user ID is the user ID of a user for whom a project pertaining to the project ID is customized. The reading conditions and the filename are reading conditions and a filename unique to a user pertaining to the user ID with respect to a project pertaining to the project ID. Although not illustrated in FIG. 11, the project may be customized with respect to the processing information and the storage association information as well.

At step S118, a record corresponding to the user ID of each access authorized user is added to the user individual information storage part 255p with respect to each project subjected to editing on the access authorized user selection screen 520. Furthermore, values are stored in the items of the tenant ID, project ID, and user ID of each added record. The logon tenant ID is stored in the item of the tenant ID of each record. The project ID of the project subjected to editing on the access authorized user selection screen 520 is stored in the item of the project ID. The user ID moved to the list box 522b on the access authorized user selection screen 520 for the project is stored in the item of the user ID. On the other hand, at this point, no values are stored in items of each added record, such as the reading conditions and the filename. That is, the user individual information, which is the customization information of each access authorized user, is registered (recorded) by each access authorized user in a subsequent process.

Figure 12:
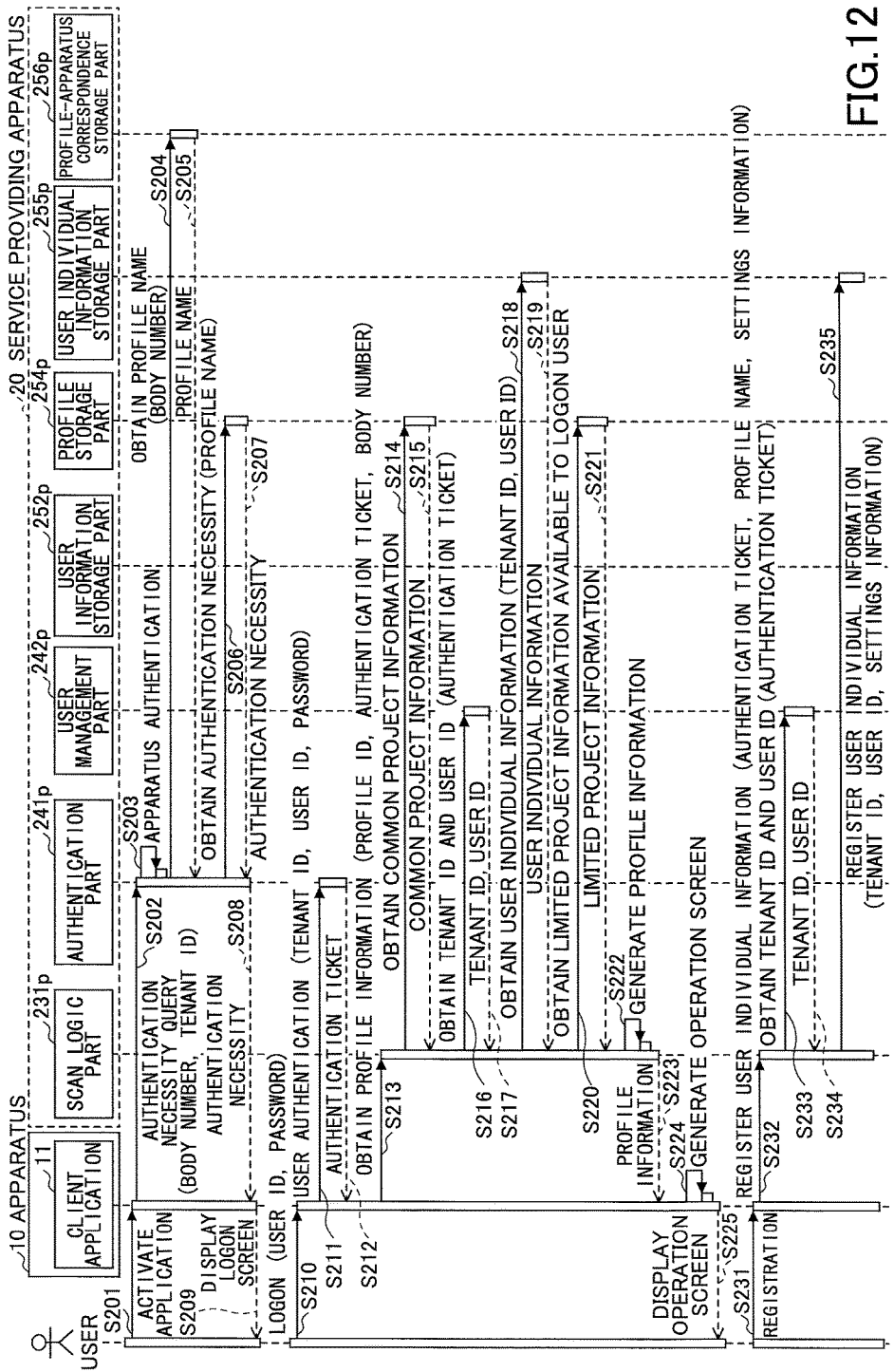
FIG. 12 is a sequence diagram for illustrating a process procedure for registering user individual information.

Next, a description is given of registration of the user individual information. FIG. 12 is a sequence diagram for illustrating a process procedure for registering user individual information. The process of FIG. 12 is executed in accordance with operations of the apparatus 10 by a user A belonging to the tenant 123. The user A refers to a user whose user ID is "A." The same naming rule is followed to refer to other users as well.

At step S201, the apparatus 10 activates the client application 11 in response to an operation instruction by the user A. When activated, at step S202, the client application 11 transmits a query about the necessity of user authentication to the authentication part 241p of the service providing apparatus 20. The query includes the body number and the tenant ID of the apparatus 10 as the authentication information of the apparatus 10. The body number and the tenant ID are, for example, stored in the apparatus 10 in advance.

In response to the query, at step S203, the authentication part 241p performs authentication with respect to the apparatus 10 that has transmitted the query based on the body number and the tenant ID included in the query. The authentication succeeds if the body number is stored in the apparatus information storage part 253p in correlation with the tenant ID. If the authentication succeeds, step S204 and the subsequent steps are executed. Hereinafter, the body number and the tenant ID based on which the authentication has succeeded at step S203 are referred to as "target body number" and "target tenant ID," respectively.

At steps S204 and S205, the authentication part 241p obtains a profile name corresponding to the target body number from the profile-apparatus correspondence storage part 256p.

FIG. 13 is a diagram illustrating a configuration of a profile-apparatus correspondence storage part. Referring to FIG. 13, the profile-apparatus correspondence storage part 256p stores a profile name in correlation with a corresponding body number. The correspondence between the body number and the profile name in the profile-apparatus correspondence storage part 256p implements the correlation between the apparatus 10 and the profile in FIG. 4.

Next, at steps S206 and S207, the authentication part 241p obtains the value of the item of the authentication necessity of a profile pertaining to the obtained profile name from the profile storage part 254p (FIG. 8). In this embodiment, it is assumed that the profile name is unique across tenants. If the uniqueness of the profile name is guaranteed only in the tenant, however, the value of the item of the authentication necessity of a profile pertaining to the target tenant ID and the obtained profile name may be obtained.

Next, at step S208, the authentication part 241p returns the obtained value ("YES" or "NO") to the client application 11. If the returned value is "YES," at step S209, the client application 11 causes a logon screen to be displayed on the operation panel of the apparatus 10.

At step S210, the user A enters a user ID and a password on the logon screen. Then, at step S211, the client application 11 transmits a user authentication request including the entered user ID and password and the tenant ID stored in the apparatus 10 to the authentication part 241p. The authentication part 241p determines that the authentication succeeds if the set of the tenant ID, the user ID, and the password included in the user authentication request is stored in the user information storage part 252p. In the case of successful authentication, the authentication part 241p generates an authentication ticket. The user management part 242p stores the generated authentication ticket in, for example, the memory unit 203 (FIG. 2) in correlation with the tenant ID and user ID based on which the authentication has succeeded. The authentication ticket is data indicating that the user is an authenticated user, and may be implemented by, for example, a cookie. The authentication ticket may have an expiration date. At step S212, the authentication part 241p returns the authentication ticket to the client application 11. A user pertaining to a user ID corresponding to the authentication ticket (that is, an authenticated user) is hereinafter referred to as "logon user." In the case of failed authentication, no authentication ticket is generated, and a response indicating an authentication failure is returned to the client application 11. In this case, step S213 and the subsequent steps are not executed.

When the authentication ticket is returned, at step S213, the client application 11 transmits a request for obtaining profile information (a profile information obtaining request) that includes a profile name, the authentication ticket, and the body number to the scan logic part 231p. The profile name is included in the profile information obtaining request if the profile information has been obtained by (downloaded to) the apparatus 10 in the past. Accordingly, no profile name is included in the obtaining request if the profile information is to be obtained by the apparatus 10 for the first time. In this case, in response to reception of the obtaining request, the scan logic part 231p obtains a profile name correlated with the body number included in the obtaining request from the profile-apparatus correspondence storage part 256p before execution of step S214. Each request from the client application 11 at and after step S213 includes the authentication ticket, and the validity of the authentication ticket is checked each time by the user management part 242p. This check process by the user management part 242p is omitted from the sequence diagram of FIG. 12. In the check process, it is confirmed that the user ID is stored in the memory unit 203 in correlation with the authentication ticket and that the authentication ticket has not expired. If the validity of the authentication ticket is not confirmed, a request from the client application 11 is rejected.

Next, at steps S214 and S215, the scan logic part 231p obtains, from the profile information storage part 254p (FIG. 8), common project information among the project information included in a profile (hereinafter referred to as "target profile") pertaining to the profile name included in the profile information obtaining request. The common project information is the information of a project whose all users access authorization/no authorization has a value of "YES" (that is, a project available to all users). Accordingly, in the case of FIG. 8, the project information of a project P002 and a project P004 corresponds to the common project information. The common project information obtained at step S215 includes the information of a group (hereinafter referred to as "group information") to which a project pertaining to the common project information belongs.

Next, at step S216, the scan logic part 231p transmits a request for obtaining the tenant ID and the user ID of the logon user to the user management part 242p. The obtaining request includes the authentication ticket. At step S217, the user management part 242p returns a tenant ID and a user ID stored in the memory unit 203 in correlation with the authentication ticket included in the obtaining request to the scan logic part 231p.

Next, at steps S218 and S219, the scan logic part 231p obtains user individual information pertaining to the tenant ID and the user ID from the user individual information storage part 255p (FIG. 11). Next, at steps S220 and S221, the scan logic part 231p obtains limited project information available to the logon user among the project information included in the target profile from the profile storage part 254p (FIG. 8). The limited project information is the information of a project whose all users access authorization/no authorization has a value of "NO" (that is, the information of a project available to limited users). Accordingly, in the case of FIG. 8, the project information of a project P001 and a project P003 corresponds to the limited project information. Furthermore, the limited project information available to the logon user refers to project information whose project ID is stored in the user individual information storage part 255p in correlation with the tenant ID and the user ID of the logon user. The limited project information obtained at step S221 includes the group information of a group to which a project pertaining to the limited project information belongs.

Next, at step S222, the scan logic part 231p combines the common profile information and the limited profile information, and generates profile information by adding (applying) the user individual information to the combined result (information). The profile information may alternatively be generated by combining the common profile information and the limited profile information to which the user individual information is added. That is, as long as the same profile information is generated, the procedure for generating the profile information does not matter. The profile name of the generated profile information is the profile name of the target profile. Furthermore, values of the limited profile information are valid for blank items (such as the reading conditions of FIG. 11) in the user individual information. Next, at step S223, the scan logic part 231p returns the generated profile information to the client application 11.

At step S224, the client application 11 generates an operation screen of the cloud scan service based on the received profile information. Then, at step S225, the client application 11 causes the operation screen to be displayed on the operation panel of the apparatus 10. The client application 11 stores the profile information in a storage device of the apparatus 10. For example, the profile name of the profile information stored at this point is included in a profile information obtaining request at step S213 of the next time.

Figure 14A:
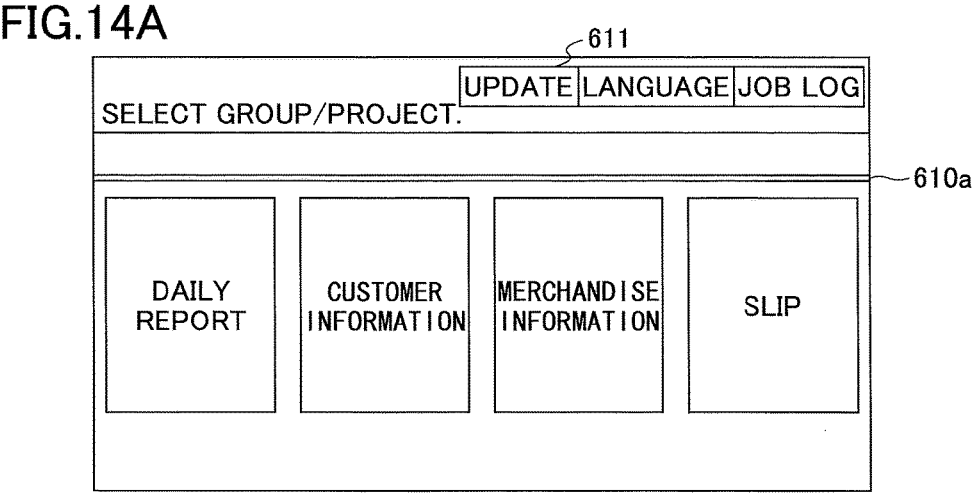
FIGS. 14A, 14B and 14C are diagrams illustrating operation screens displayed based on profile information.
Figure 14B:
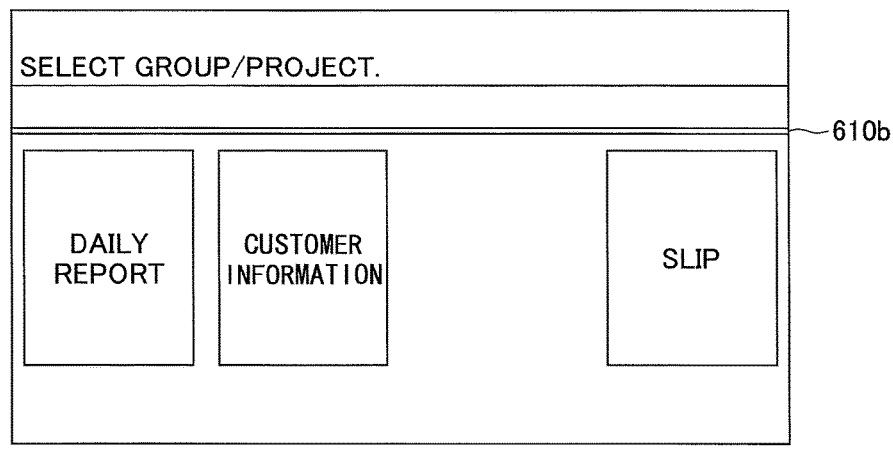
Figure 14C:
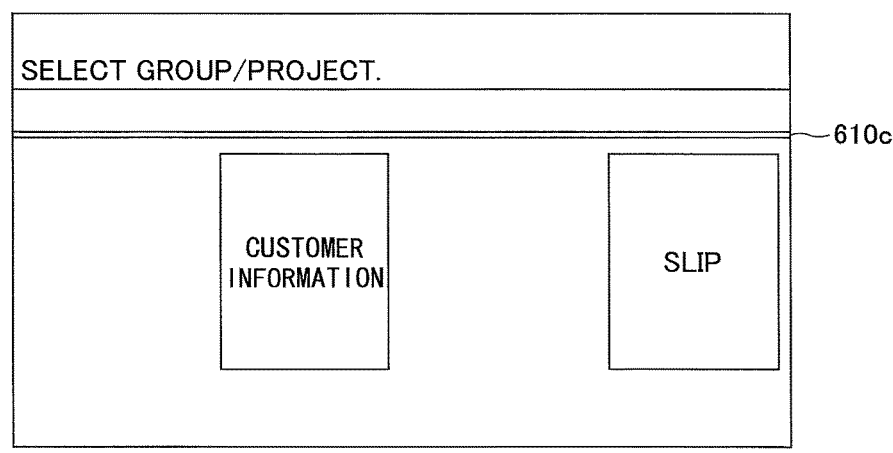

FIGS. 14A, 14B and 14C are diagrams illustrating operation screens displayed based on profile information. FIGS. 14A through 14C illustrate operation screens that are displayed depending on whether the logon user is the user A, a user B, or a user other than the users A and B when the profile whose profile name is "A4pf" illustrated in FIG. 8 is a target profile. In the target profile, the project information of the project P002 and the project P004 corresponds to common projects and the project information of the project P001 and the project P003 corresponds to limited projects.

Referring to FIG. 14A, an operation screen 610a is displayed when the user A is a logon user. That is, referring to FIG. 11, the limited projects available to the user A are the project P001 and the project P003. Accordingly, buttons corresponding to all projects belonging to the target profile are displayed on the operation screen 610a.

Referring to FIG. 14B, an operation screen 610b is displayed when the user B is a logon user. That is, referring to FIG. 11, the limited project available to the user B is the project P001. In other words, the user B cannot use the project P003. Accordingly, buttons corresponding to projects except the project P003 are displayed on the operation screen 610b.

Referring to FIG. 14C, an operation screen 610c is displayed when the logon user is neither the user A nor the user B. That is, referring to FIG. 11, no limited projects are available to such a logon user. Accordingly, buttons corresponding to projects except the project P001 and the project P003 are displayed on the operation screen 610c. In this embodiment, because the logon user is the user A, the operation screen 610a is displayed at step S225.

When an UPDATE button 611 is depressed with any of the buttons of the projects being selected on the operation screen 610a, the client application 11 causes a setting screen for editing the selected project to be displayed on the operation panel.

Figure 15:
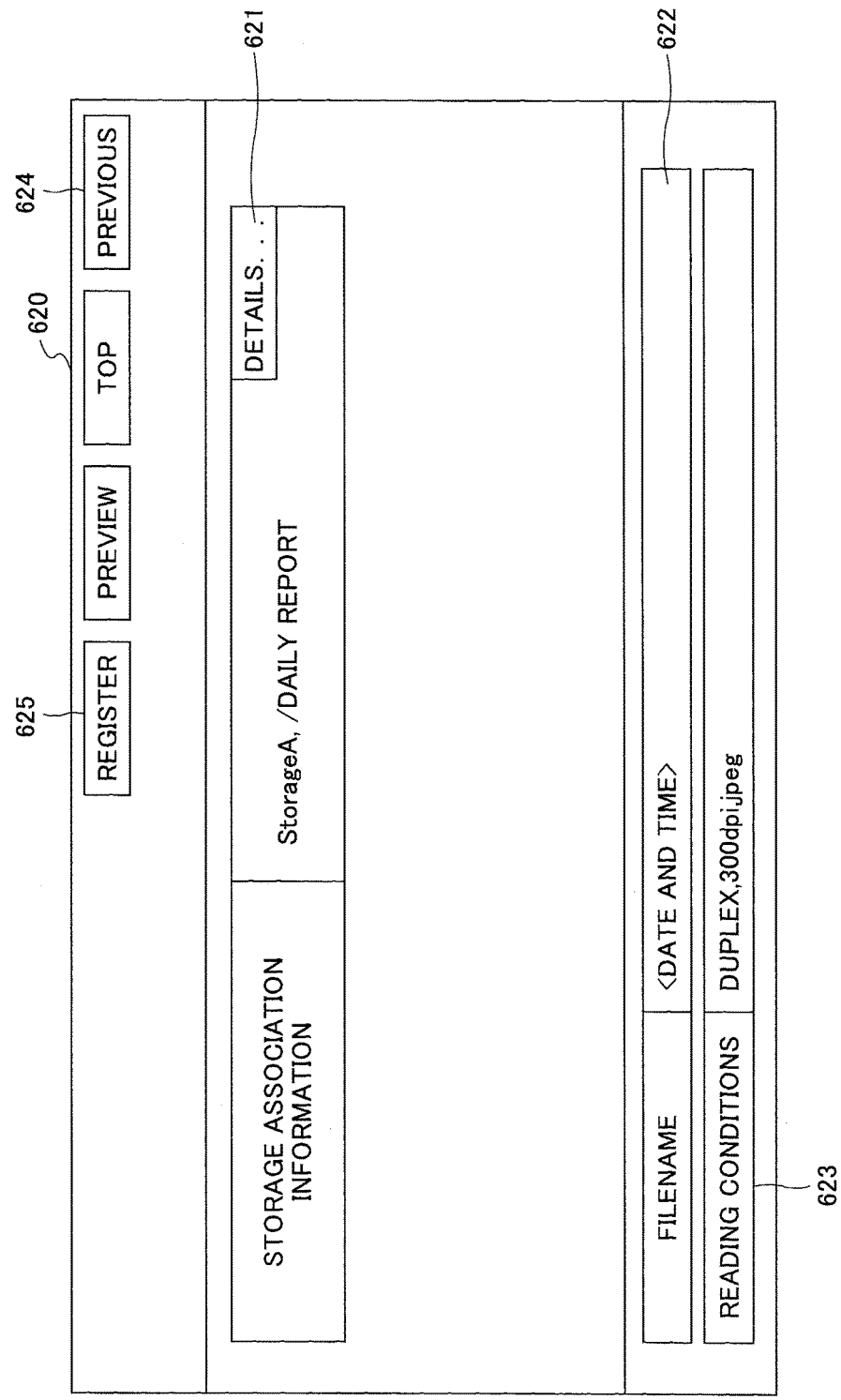
FIG. 15 is a diagram illustrating a setting screen.

FIG. 15 is a diagram illustrating a setting screen. Referring to FIG. 15, a setting screen 620 includes a user interface for making it possible to change the storage association information, the filename, and the reading conditions of a project subjected to editing at the time of execution of a job of the cloud scan service. The initial state of the setting screen 620 complies with the received profile information. When a DETAILS button 621 is depressed, the client application 11 causes a screen for setting the storage association information to be displayed on the operation panel. Furthermore, a character string that indicates a filename may be entered in a textbox 622. Furthermore, when a button 623 is depressed, the client application 11 causes a screen for setting reading conditions (hereinafter referred to as "reading conditions setting screen") to be displayed on the operation panel.

Figure 16:
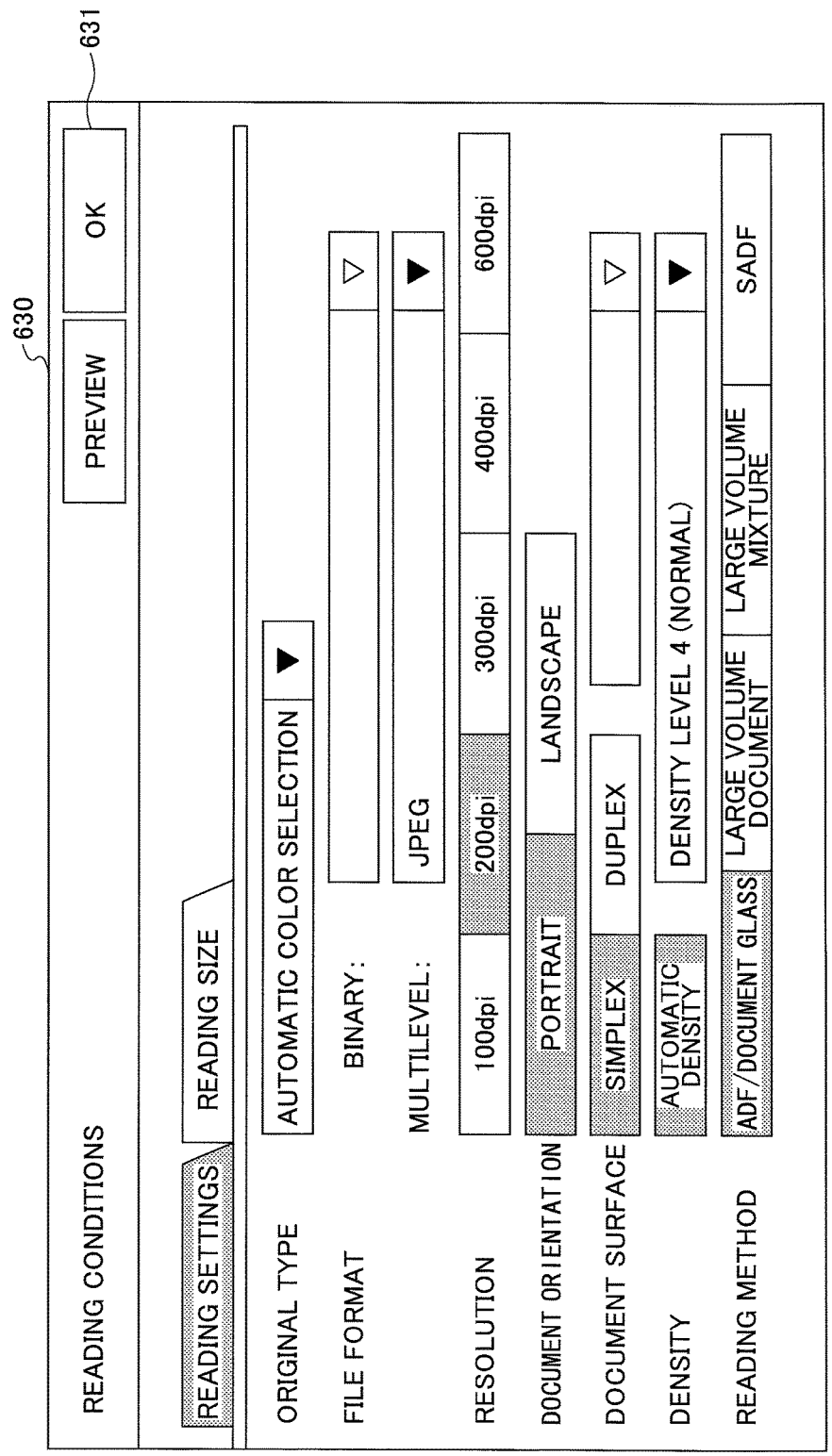
FIG. 16 is a diagram illustrating a display example of a reading conditions setting screen.

FIG. 16 is a diagram illustrating a display example of a reading conditions setting screen. On a reading conditions setting screen 630, it is possible to set the value of each of the items of reading conditions. The initial state of the reading conditions setting screen 630 complies with the received profile information. When one or more of the values of the items is changed and an OK button 630 is depressed, the settings on the reading conditions setting screen 630 are stored in a memory of the apparatus 10, and the screen for display changes to the setting screen 620 (FIG. 15).

When a PREVIOUS button 624 is depressed on the setting screen 620, the screen for display changes to the operation screen 610a (FIG. 14A). When a job is started in this state, the information set on the setting screen 620 and the reading conditions setting screen 630 overrides the received profile information for the job of this time only.

On the other hand, when a REGISTER button 625 is depressed on the setting screen 620 at step S231, at step S232, the client application 11 transmits a request for registration (a registration request) of the user individual information to the scan logic part 231p. The registration request includes the authentication ticket, the profile name of the profile information received at step S223, and the information set on the setting screen 620 and the reading conditions setting screen 630 (the settings information).

In response to the registration request, at steps S233 and S234, the scan logic part 231p obtains a tenant ID and a user ID corresponding to the authentication ticket included in the registration request from the user management part 242p the same as at steps S216 and S217. Next, at step S235, the scan logic part 231p stores the settings information included in the registration request in a record pertaining to the obtained tenant ID and user ID in the user individual information storage part 255p.

FIG. 17 is a diagram illustrating a user individual information storage part with which settings information is registered. FIG. 17 illustrates a case where reading conditions are registered for the user A with respect to the project p001.

Figure 18:
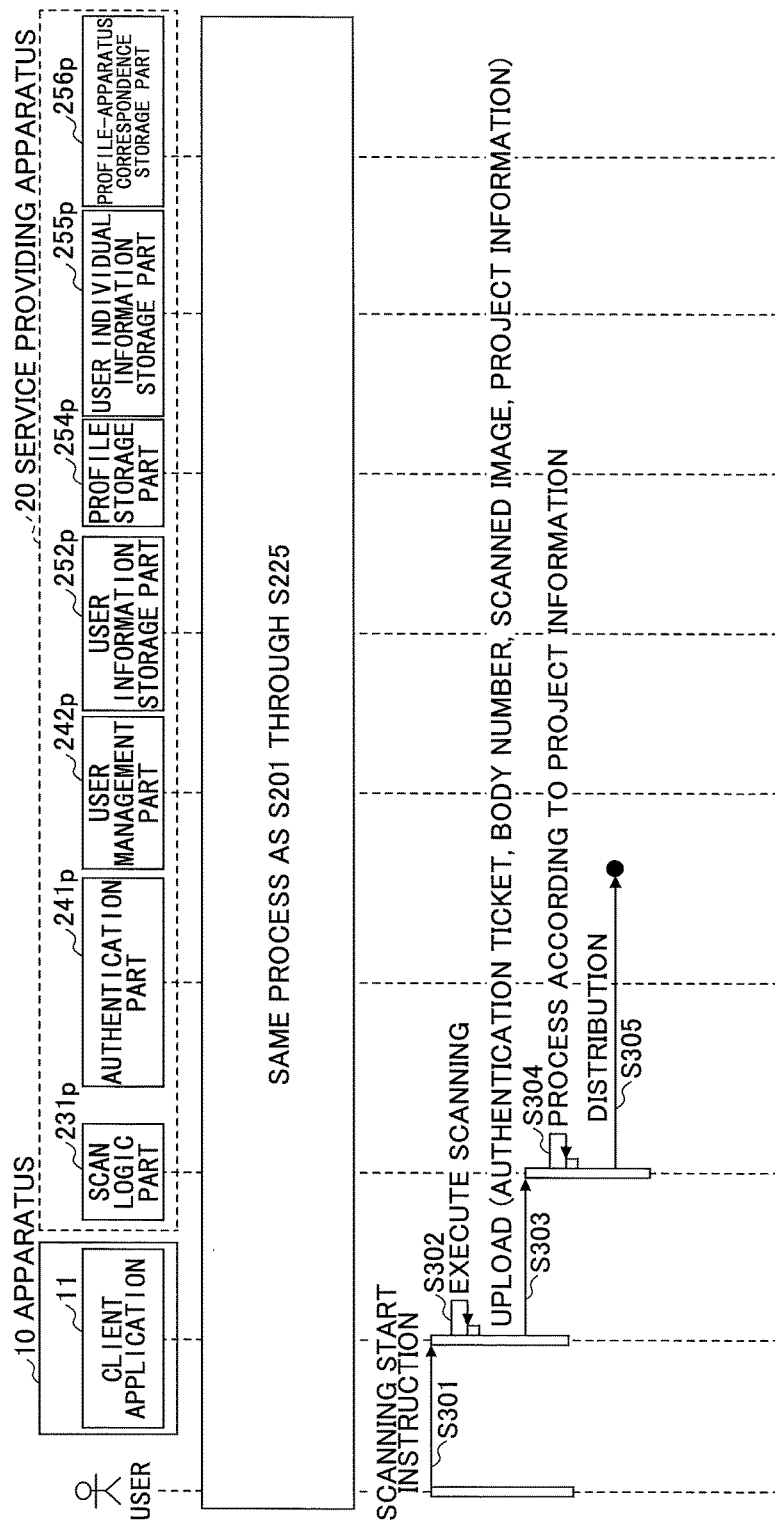
FIG. 18 is a sequence diagram for illustrating a process procedure at the time of execution of a job of a cloud scan service.

Next, a description is given of a process procedure at the time of execution of a job of a cloud scan service. FIG. 18 is a sequence diagram for illustrating a process procedure at the time of execution of a job of a cloud scan service. The process of FIG. 18 is executed in accordance with operations of the apparatus 10 by the user A. Furthermore, it is assumed that the process of FIG. 18 is executed when the user A operates the apparatus 10 again after causing the process of FIG. 12 to be executed. Accordingly, it is assumed that the condition of the user individual information storage part 255p is as illustrated in FIG. 17.

First, steps S201 through S225 illustrated in FIG. 12 are executed. As a result, the operation screen 610a is displayed on the operation panel of the apparatus 10. In the case of FIG. 18, the value illustrated in FIG. 17 is stored in the reading conditions of the project P001 in the user individual information obtained at step S219. Accordingly, the project information pertaining to the project P001 to which the value is written (added) is received by the client application 11 at step S223.

At step S301, the user A sets an original material in the apparatus 10 and inputs an instruction to start scanning while selecting a button corresponding to the project P001 on the operation screen 610a. Then, at step S302, the client application 11 causes the apparatus 10 to scan the original material in accordance with the reading conditions of the project P001. Here, the user individual information (FIG. 17) of the user A has been written over the reading conditions of the project P001. Accordingly, the scan at step S302 is executed in accordance with the reading conditions indicated by the user individual information of the user A with respect to the project P001. The image data scanned from the original material are hereinafter referred to as "scanned image."

Next, at step S303, the client application 11 uploads the scanned image, along with the authentication ticket, the body number, and project information, to the scan logic part 231p. The project information is the project information of the project P001 selected on the operation screen 610a. If a change has been made to the project information via the setting screen 620, however, the project information in which the change is reflected is uploaded. The uploading of information including project information at step S303 is a request for execution of a process (a processing request) corresponding to the project ID included in the project information.

Next, at step S304, the scan logic part 231p executes a process according to the uploaded project information with respect to the uploaded scanned image. For example, if optical character recognition (OCR) is specified in the processing information of the project information, OCR is performed on the scanned image. Next, at step S305, the scan logic part 231p distributes data generated as a result of the process according to the project information to a distribution destination according to the storage association information of the project information. The data generated as a result of the process according to the project information are, for example, text data output as a result of OCR when OCR is performed on the scanned image.

If the same profile is assigned to multiple apparatuses 10, the process of FIG. 18 is executed based on the same profile information from any of the apparatuses 10. This is because profiles are stored in the service providing apparatus 20 and profile information assigned to each apparatus 10 in the profile-apparatus correspondence storage part 256p is downloaded to the apparatus 10. Accordingly, it is possible for the user A to use any of the apparatuses 10 to which the same profile is assigned to execute a job with the same user individual information being applied in the same manner. Accordingly, there is no need for the user A to set user individual information from apparatus 10 to apparatus 10. The same is the case with other users.

Next, a description is given of a process procedure that is executed when the apparatus 10 assigned a profile whose authentication necessity is "NO" is to be operated.

Figure 19:
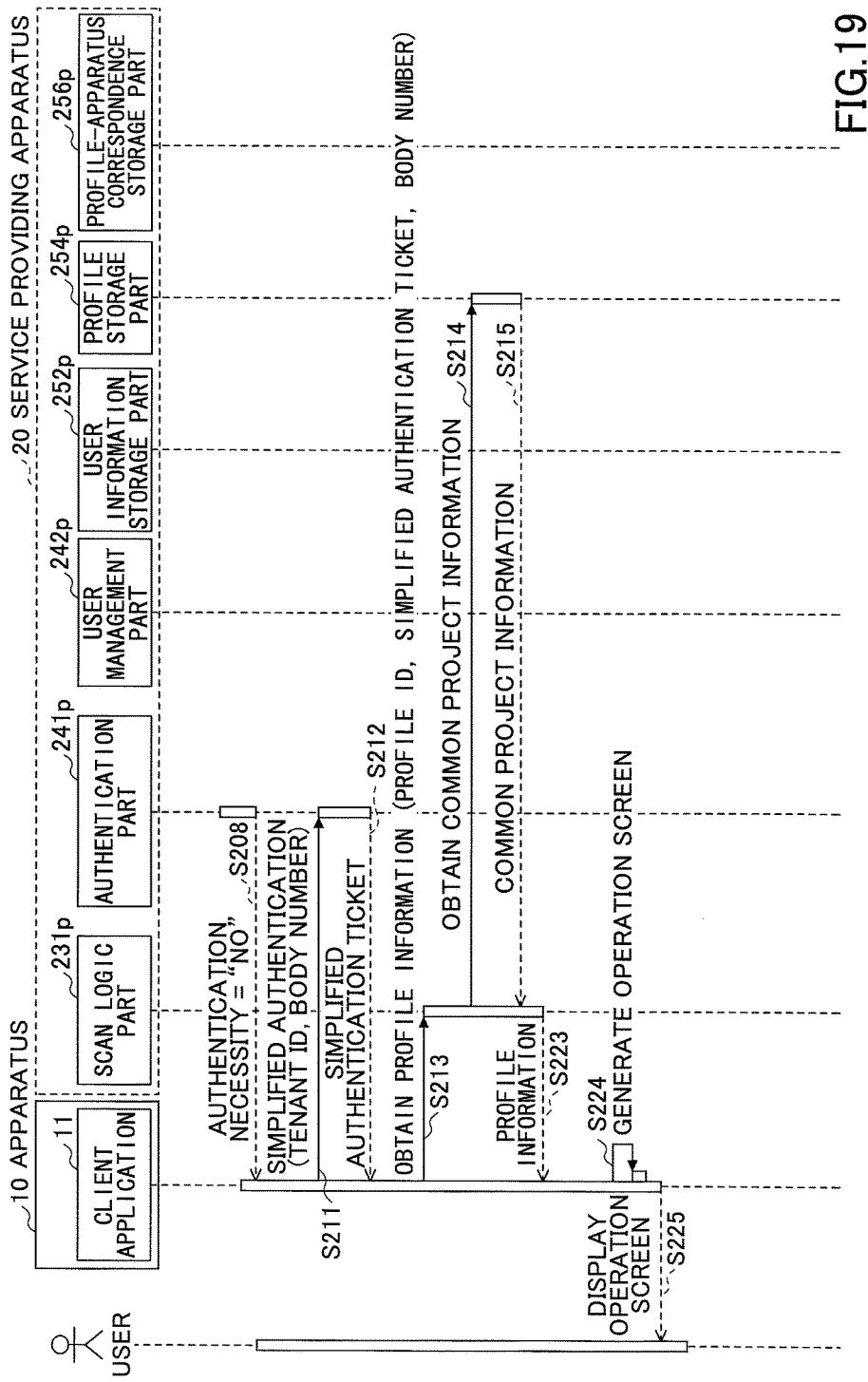
FIG. 19 is a sequence diagram for illustrating a process procedure at the time of execution of a job of a cloud scan service pertaining to an apparatus assigned a profile that requires no authentication.

FIG. 19 is a sequence diagram for illustrating a process procedure at the time of execution of a job of a cloud scan service pertaining to an apparatus assigned a profile that requires no authentication. In FIG. 19, the same steps as or steps corresponding to those of FIG. 18 (FIG. 12) are referred to by the same step numbers.

In FIG. 19, steps S201 through S207 are omitted for convenience. At step S208, the authentication part 241p returns a response indicating that the authentication necessity is "NO" to the client application 11.

In response to no necessity of authentication, at step S211, the client application 11 transits a request for simplified authentication (a simplified authentication request) including a tenant ID and a body number to the authentication part 241p. That is, when no authentication is required, no logon screen is displayed, so that there is no inputting of a user ID or password to a logon screen. Furthermore, a request is made to the authentication part 241p for simplified authentication instead of user authentication. The simplified authentication is substantially the same as the apparatus authentication described at step S203 of FIG. 12.

If the tenant ID and the body number specified in the simplified authentication request are stored in the apparatus information storage part 253p, the authentication part 241p determines that the simplified authentication succeeds. When the simplified authentication succeeds, at step S212, the authentication part 241p returns a simplified authentication ticket to the client application 11. The user management part 242p correlates and stores the simplified authentication ticket and the tenant ID and body number in, for example, the memory unit 203 (FIG. 2).

Next, at step S213, the client application 11 transmits a profile information obtaining request including a profile name, the simplified authentication ticket, and the body number to the scan logic part 231p. Next, at steps S214 and S215, the scan logic part 231p obtains, from the profile information storage part 254p (FIG. 8), common project information among the project information included in a profile pertaining to the profile name included in the profile information obtaining request.

Next, at step S223, the scan logic part 231p returns profile information composed of the common project information to the client application 11. That is, when the simplified authentication ticket is included in the profile information obtaining request, the scan logic part 231p executes step S223 without executing steps S216 through S222. The distinction between the authentication ticket in FIG. 12 or FIG. 18 and the simplified authentication ticket may be made based on, for example, a difference in configuration from each other. In the case of having the same configuration, the authentication ticket and the simplified authentication ticket may alternatively be distinguished from each other by a difference between the information correlated with the authentication ticket and the information correlated with the simplified authentication ticket. That is, the authentication ticket in FIG. 12 or FIG. 18 is correlated with a tenant ID and a user ID, while the simplified authentication ticket is correlated with a tenant ID and a body number.

At and after step S224, the process procedure described in FIG. 12 or FIG. 18 is executed. As an operation screen, however, the operation screen 610c (FIG. 14) is displayed. That is, buttons corresponding to projects pertaining to the common project information are displayed on the operation screen. Furthermore, in FIG. 19, steps after step S225 of FIG. 12 are prevented from being executed. That is, with respect to a profile whose authentication necessity is "NO," registration of user individual information is prevented. This is because without user authentication, the service providing apparatus 20 cannot specify the user ID of an operator of the apparatus 10, and accordingly, cannot correlate user individual information with the operator.

As described above, according to this embodiment, it is possible to register user individual information user by user. Furthermore, when profile information is downloaded to the apparatus 10, user individual information pertaining to a logon user is written to the profile. That is, profile information suitable for the logon user is downloaded to the apparatus 10. Accordingly, it is possible to execute a process suitable for a user.

In the case of performing user authentication, the availability of processing may be limited user by user with respect to the processing information such as OCR. For example, available processing may be determined user by user, and an available quantity may be determined user by user with respect to individual processing. The available quantity may be, for example, the number of pages in the case of OCR. When a request that goes beyond the limitation is made, a message to that effect may be displayed on the operation panel of the apparatus 10.

The profile-apparatus correspondence storage part 256p and the profile storage part 254p, and the user individual information storage part 255p may be included in either the same storage device (such as the secondary storage device 202 of FIG. 2) or different storage devices. Furthermore, the profile-apparatus correspondence storage part 256p, the profile storage part 254p, and the user individual information storage part 255p may alternatively be included in an external storage device connected to the service providing apparatus 20 via a network. By including these storage devices 254p through 256p in an external storage device, it is possible to collectively manage information stored in these storage devices 254p through 256p when, for example, the service providing apparatus 20 is installed area by area (for example, country by country). As a further alternative, the profile-apparatus correspondence storage part 256p and the profile storage part 254p may be included in the secondary storage device 202, and the user individual information storage part 255p may be stored in an external storage device. In this case, it is possible to collectively manage user individual information that is highly confidential.

Furthermore, in the above-described embodiments, a description is given of the case where an image forming apparatus is a specific example of the apparatus 10, while a cellular phone, a smartphone, a tablet terminal, a PC, or a digital camera may alternatively be an inputter (transmitter) of image data to the service providing apparatus 20.

In the above-described embodiments, the service providing apparatus 20 is an example of an information processing apparatus or an information processing system. The body number is an example of apparatus identification information. The project ID is an example of process identification information. The project information is an example of setting information. The profile-apparatus correspondence storage part 256p and the profile storage part 254p are an example of a first storage part. The user ID is an example of user identification information. The user individual information is an example of change information. The user individual information storage part 255p is an example of a second storage part. The scan logic part 231p is an example of a process control part. The tenant ID is an example of organization identification information. The apparatus information storage part 253p is an example of a third storage part. The all users access authorization/no authorization of the project information is an example of information indicating whether users authorized to use a process pertaining to the process identification information are limited. The tenant is an example of a contract organization.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. An information processing apparatus and method have been described above based on one or more embodiments. It should be understood, however, that the various changes, substitutions, and alterations could be made hereto without departing from the spirit and scope of the invention.

What is claimed is:

1. An information processing system comprising:
   a plurality of apparatuses each of which is configured to scan image data of an original material set in said each of the plurality of apparatuses;
   an information processing apparatus connected to the plurality of apparatuses via a network to execute processing according to processing requests from the plurality of apparatuses;
   a first storage device correlating and storing process identification information identifying a process and setting information of the process with respect to each of items of apparatus identification information identifying the plurality of apparatuses, the setting information including items that include: one or more conditions of reading the image data at a time of scanning the image data by said each of the plurality of apparatuses;
   and storage information indicating a predetermined storage to which the scanned image data are to be distributed; and
   a second storage device correlating and storing the process identification information, change information that changes a part or entirety of the items of the setting information stored in the first storage device in correlation with the process identification information, and user identification information identifying a user to whom the change information is applied among users authorized to use the information processing system,
   wherein the information processing apparatus includes
   a processor; and
   a memory storing a program that, when executed by the processor, causes the information processing apparatus to
      receive a processing request including the process identification information identifying the process, and the user identification information, from an apparatus among the plurality of apparatuses;
      when the received user identification information is stored in the second storage device in correlation with the received process identification information, apply the change information stored in the second storage device in correlation with the received user identification information to the setting information stored in correlation with the apparatus identification information identifying the apparatus and with the received process identification information to update the setting information; and
      return the updated setting information to the apparatus,
   wherein the apparatus is configured to scan the image data based on the updated setting information returned from the information processing apparatus, and upload the scanned image data together with the updated setting information to the information processing apparatus, and
   wherein the program further causes the information processing apparatus to
      receive the uploaded scanned image data together with the uploaded updated setting information from the apparatus;
      process the received scanned image data according to the received updated setting information; and
      distribute the processed scanned image data to the predetermined storage.

2. The information processing system as claimed in claim 1,
   wherein the first storage device stores the setting information in correlation with organization identification information that identifies contract organizations that are under contract to use a service that the information processing apparatus provides by executing the process,
   wherein the information processing system further includes a third storage device storing the organization identification information in correlation with the apparatus identification information of the plurality of apparatuses, and
   wherein the program causes the information processing apparatus to, in response to the reception of the processing request including the process identification information identifying said process from the apparatus, apply the change information pertaining to the process identification information, stored in the second storage device in correlation with the user identification information received from the apparatus with respect to the processing request, to the setting information stored in the first storage device in correlation with the apparatus identification information and the organization identification information that identify the apparatus and with the received process identification information.

3. The information processing system as claimed in claim 1,
wherein the first storage device stores, with respect to the process identification information of the process, additional information indicating whether all of a plurality of users are authorized to use the process identified by the process identification information,
wherein the second storage device stores the change information in correlation with the user identification information of the users authorized to use the process identified by the process identification information with respect to the process identification information of the process with respect to which the users authorized to use the process are limited, and
wherein the program causes the information processing apparatus to, in response to the reception of the processing request including the process identification information identifying said process from the apparatus, apply the change information stored in the second storage device in correlation with the user identification information to the setting information stored in the first storage device in correlation with the process identification information, when the additional information indicates that all of the plurality of users are not authorized to use the process identified by the process identification information with respect to the process identification information stored in the first storage device in correlation with the apparatus identification information identifying the apparatus, and the user identification information received from the apparatus with respect to the processing request is stored in the second storage device in correlation with the process identification information.

4. The information processing system as claimed in claim 1,
wherein the first storage device stores additional information indicating whether to perform user authentication in correlation with the process identification information,
wherein the program causes the information processing apparatus to, in response to a query about necessity of the user authentication including the apparatus identification information and the process identification information from the apparatus, request the apparatus to transmit the user identification information and perform the user authentication based on the user identification information transmitted from the apparatus, when the additional information indicates that the user authentication is to be performed in correlation with the apparatus identification information and the process identification information included in the received query, and
wherein the program causes the information processing apparatus to, in response to the reception of the processing request including the process identification information identifying said process from the apparatus, apply the change information pertaining to the process identification information, stored in the second storage device in correlation with the user identification information based on which the performed user authentication succeeds, to the setting information stored in the first storage device in correlation with the apparatus identification information identifying the apparatus and with the received process identification information.

5. The information processing system as claimed in claim 1, wherein the first storage device and the second storage device are included in a same storage device.

6. The information processing system as claimed in claim 1, wherein
the change information includes one or more conditions of reading the image data at the time of scanning the image data and storage information indicating a predetermined storage to which the scanned image data are to be distributed, the one or more conditions and the storage information of the change information being unique to the user to whom the change information is applied, and
the information processing apparatus is caused to write the change information over the part or the entirety of the items of the setting information when the received user identification information is stored in the second storage device in correlation with the received process identification information.

7. The information processing system as claimed in claim 1, wherein the apparatus is configured to generate and display an operation screen for editing or storing the updated setting information returned from the information processing apparatus, and to scan the image data based on the edited or stored updated setting information.

8. An information processing system comprising:
a plurality of apparatuses each of which is configured to scan image data of an original material set in said each of the plurality of apparatuses; and
an information processing apparatus connected to the plurality of apparatuses via a network to execute processing according to processing requests from the plurality of apparatuses, the information processing apparatus including
a processor; and
a memory storing a program that, when executed by the processor, causes the information processing apparatus to
receive a processing request including process identification information identifying a process, and user identification information, from an apparatus among the plurality of apparatuses;
obtain setting information stored in correlation with apparatus identification information identifying the apparatus and the received process identification information in a first storage device, the setting information including items that include: one or more conditions of reading the image data at a time of scanning the image data by said each of the plurality of apparatuses; and storage information indicating a predetermined storage to which the scanned image data are to be distributed;
when the received user identification information is stored in a second storage device in correlation with the received process identification information, the second storage device correlating and storing the process identification information, change information that changes a part or entirety of the items of the setting information stored in the first storage device in correlation with the process identification information, and user identification information identifying a user to whom the change information is applied among users authorized to use the information processing system, obtain the change information stored in the second storage device in correlation with the received user identification information, and apply the obtained change information to the obtained setting information to update the setting information; and return the updated setting information to the apparatus, wherein the apparatus is configured to scan the image data based on the updated setting information returned from the information processing apparatus, and upload the scanned image data together with the updated setting information to the information processing apparatus, and wherein the program further causes the information processing apparatus to receive the uploaded scanned image data together with the uploaded updated setting information from the apparatus;

process the received scanned image data according to the received updated setting information; and distribute the processed scanned image data to the predetermined storage.

9. The information processing system as claimed in claim 8, wherein the change information includes one or more conditions of reading the image data at the time of scanning the image data and storage information indicating a predetermined storage to which the scanned image data are to be distributed, the one or more conditions and the storage information of the change information being unique to the user to whom the change information is applied, and the information processing apparatus is caused to write the change information over the part or the entirety of the items of the setting information when the received user identification information is stored in the second storage device in correlation with the received process identification information.

10. The information processing system as claimed in claim 8, wherein the apparatus is configured to generate and display an operation screen for editing or storing the updated setting information returned from the information processing apparatus, and to scan the image data based on the edited or stored updated setting information.

11. An information processing method executed by an information processing system including a plurality of apparatuses each of which is configured to scan image data of an original material set in said each of the plurality of apparatuses and an information processing apparatus connected to the plurality of apparatuses via a network to execute processing according to processing requests from the plurality of apparatuses, the information processing apparatus including a processor and a memory storing a program that, when executed by the processor, causes the information processing apparatus to execute the processing, the information processing method comprising:

using, by the information processing apparatus, a first storage device correlating and storing process identification information identifying a process and setting information of the process with respect to each of items of apparatus identification information identifying the plurality of apparatuses, the setting information including items that include: one or more conditions of reading the image data at a time of scanning the image data by said each of the plurality of apparatuses; and storage information indicating a predetermined storage to which the scanned image data are to be distributed, and a second storage device correlating and storing the process identification information, change information that changes a part or entirety of the items of the setting information stored in the first storage device in correlation with the process identification information, and user identification information identifying a user to whom the change information is applied among users authorized to use the information processing system;

receiving, by the information processing apparatus, a processing request including the process identification information identifying the process, and the user identification information, from an apparatus among the plurality of apparatuses;

when the received user identification information is stored in the second storage device in correlation with the received process identification information, applying, by the information processing apparatus, the change information stored in the second storage device in correlation with the received user identification information to the setting information stored in correlation with the apparatus identification information identifying the apparatus and with the received process identification information to update the setting information;

returning, by the information processing apparatus, the updated setting information to the apparatus;

scanning, by the apparatus, the image data based on the updated setting information returned from the information processing apparatus;

uploading, by the apparatus, the scanned image data together with the updated setting information to the information processing apparatus;

receiving, by the information processing apparatus, the uploaded scanned image data together with the uploaded updated setting information from the apparatus;

processing, by the information processing apparatus, the received scanned image data according to the received updated setting information; and distributing, by the information processing apparatus, the processed scanned image data to the predetermined storage.

12. The information processing method as claimed in claim 11, wherein the change information includes one or more conditions of reading the image data at the time of scanning the image data and storage information indicating a predetermined storage to which the scanned image data are to be distributed, the one or more conditions and the storage information of the change information being unique to the user to whom the change information is applied, and the change information is written over the part or the entirety of the items of the setting information when the received user identification information is stored in the second storage device in correlation with the received process identification information.

13. The information processing method as claimed in claim 11, further comprising:

generating and displaying, by the apparatus, an operation screen for editing or storing the updated setting information returned from the information processing apparatus, wherein said scanning scans the image data based on the edited or stored updated setting information.

* * * * *